United States Patent
Bradley et al.

(10) Patent No.: US 11,836,441 B2
(45) Date of Patent: *Dec. 5, 2023

(54) MODULAR SYSTEMS AND METHODS FOR SELECTIVELY ENABLING CLOUD-BASED ASSISTIVE TECHNOLOGIES

(71) Applicant: AudioEye, Inc., Tucson, AZ (US)

(72) Inventors: Sean D. Bradley, Tucson, AZ (US);
Mark D. Baker, Marietta, GA (US);
Jeffrey O. Jones, Mountain Park, GA (US); Kenny P. Hefner, Buchanan, GA (US); Adam Finkelstein, Alpharetta, GA (US); Douglas J. Gilormo, Cumming, GA (US); Taylor R. Bodnar, Tucson, AZ (US); David C. Pinckney, Roswell, GA (US); Charlie E. Blevins, Atlanta, GA (US); Trevor C. Jones, Kennesaw, GA (US); Helena Laymon, Duluth, GA (US)

(73) Assignee: AudioEye, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,654

(22) Filed: Sep. 14, 2021

(65) Prior Publication Data
US 2022/0269849 A1    Aug. 25, 2022

Related U.S. Application Data

(63) Continuation of application No. 17/147,323, filed on Jan. 12, 2021, now Pat. No. 11,157,682, which is a
(Continued)

(51) Int. Cl.
G06F 17/00 (2019.01)
G06F 40/143 (2020.01)
(Continued)

(52) U.S. Cl.
CPC .......... *G06F 40/143* (2020.01); *G06F 3/0482* (2013.01); *G06F 3/04817* (2013.01);
(Continued)

(58) Field of Classification Search
CPC . H04L 67/02; H04L 67/535; G10L 2015/221; G10L 13/02; G10L 15/26;
(Continued)

(56) References Cited

U.S. PATENT DOCUMENTS

| | | | |
|---|---|---|---|
| 5,918,223 | A | 6/1999 | Blum et al. |
| 5,930,752 | A | 7/1999 | Kawaguchi et al. |

(Continued)

FOREIGN PATENT DOCUMENTS

| | | |
|---|---|---|
| CA | 2773088 A1 | 3/2011 |
| CA | 2800723 A1 | 12/2011 |

(Continued)

OTHER PUBLICATIONS

Asakawa et al., "Annotation-Based Transcoding for Nonvisual Web Access", In Proceedings of the 4th ACM Conference on Assistive Technologies, ASSETS 2000, Arlington, Virginia, USA, (Nov. 13-15, 2000), pp. 172-179.

(Continued)

*Primary Examiner* — Mohammed H Zuberi
(74) *Attorney, Agent, or Firm* — Knobbe, Martens, Olson & Bear, LLP

(57) ABSTRACT

Methods and systems for manual and programmatic remediation of websites. JavaScript code is accessed by a user device and optionally calls TTS, ASR, and RADAE modules from a remote server to thereby facilitate website navigation by people with diverse abilities.

20 Claims, 13 Drawing Sheets

Related U.S. Application Data continuation of application No. 16/430,210, filed on Jun. 3, 2019, now Pat. No. 10,928,978, which is a continuation of application No. 15/074,818, filed on Mar. 18, 2016, now Pat. No. 10,444,934.

(51) Int. Cl.

| | | |
|---|---|---|
| *G10L 15/22* | (2006.01) | |
| *G06F 40/117* | (2020.01) | |
| *G06F 40/14* | (2020.01) | |
| *H04L 67/50* | (2022.01) | |
| *G06F 3/04817* | (2022.01) | |
| *G06F 3/0482* | (2013.01) | |
| *G06F 3/16* | (2006.01) | |
| *G10L 13/027* | (2013.01) | |
| *G10L 15/02* | (2006.01) | |
| *G10L 13/02* | (2013.01) | |
| *H04L 67/02* | (2022.01) | |

(52) U.S. Cl.
CPC ............ *G06F 3/167* (2013.01); *G06F 40/117* (2020.01); *G06F 40/14* (2020.01); *G10L 13/027* (2013.01); *G10L 15/02* (2013.01); *G10L 15/22* (2013.01); *H04L 67/535* (2022.05); *G10L 13/02* (2013.01); *G10L 2015/221* (2013.01); *H04L 67/02* (2013.01)

(58) Field of Classification Search
CPC ....... G10L 15/22; G10L 13/027; G06F 3/167; G06F 3/0482; G06F 3/04817; G06F 40/14; G06F 40/117; G06F 40/143
See application file for complete search history.

(56) References Cited

U.S. PATENT DOCUMENTS

| | | |
|---|---|---|
| 5,991,781 A | 11/1999 | Nielsen |
| 6,092,039 A | 7/2000 | Zingher |
| 6,240,448 B1 | 5/2001 | Imielinski et al. |
| 6,606,374 B1 | 8/2003 | Rokoff et al. |
| 6,665,642 B2 | 12/2003 | Kanevsky et al. |
| 6,742,021 B1 | 5/2004 | Halverson et al. |
| 6,751,544 B2 | 6/2004 | Hashimoto et al. |
| 6,880,014 B2 | 4/2005 | Brown et al. |
| 6,934,684 B2 | 8/2005 | Alpdemir et al. |
| 6,940,953 B1 | 9/2005 | Eberle et al. |
| 6,944,665 B2 | 9/2005 | Brown et al. |
| 6,959,279 B1 | 10/2005 | Jackson et al. |
| 7,010,581 B2 | 3/2006 | Brown et al. |
| 7,028,306 B2 | 4/2006 | Boloker et al. |
| 7,106,220 B2 | 9/2006 | Gourgey et al. |
| 7,124,366 B2 | 10/2006 | Foreman et al. |
| 7,174,293 B2 | 2/2007 | Kenyon et al. |
| 7,181,692 B2 | 2/2007 | Siegel |
| 7,194,411 B2 | 3/2007 | Slotznick et al. |
| 7,194,752 B1 | 3/2007 | Kenyon et al. |
| 7,219,136 B1 | 5/2007 | Danner et al. |
| 7,246,058 B2 | 7/2007 | Burnett |
| 7,284,255 B1 | 10/2007 | Apel et al. |
| 7,546,531 B2 | 6/2009 | Celik |
| 7,653,544 B2 | 1/2010 | Bradley et al. |
| 7,702,674 B2 | 4/2010 | Hyder et al. |
| 7,810,087 B2 | 10/2010 | O'Brien |
| 7,849,448 B2 | 12/2010 | Yunus et al. |
| 7,966,184 B2 | 6/2011 | Bradley et al. |
| 8,046,229 B2 | 10/2011 | Bradley et al. |
| 8,055,713 B2 | 11/2011 | Simske et al. |
| 8,090,800 B2 | 1/2012 | Yee |
| 8,103,956 B2 | 1/2012 | Trujillo |
| 8,255,827 B2 | 8/2012 | Malik |
| 8,260,616 B2 | 9/2012 | O'Conor et al. |
| 8,260,903 B2 | 9/2012 | Ganesh et al. |
| 8,296,150 B2 | 10/2012 | Bradley et al. |
| 8,321,502 B2 | 11/2012 | Scoda |
| 8,438,485 B2 | 5/2013 | Kulis et al. |
| 8,448,084 B2 | 5/2013 | Brichter |
| 8,452,600 B2 | 5/2013 | Fleizach |
| 8,516,362 B2 | 8/2013 | Scoda |
| 8,527,862 B2 | 9/2013 | Scoda et al. |
| 8,572,549 B2 | 10/2013 | Ganesh et al. |
| 8,589,169 B2 | 11/2013 | Bradley et al. |
| 8,589,484 B2 | 11/2013 | Scoda |
| 8,613,039 B2 | 12/2013 | Chen |
| 8,650,474 B2 | 2/2014 | Scoda |
| 8,694,319 B2 | 4/2014 | Bodin et al. |
| 8,769,169 B2 | 7/2014 | Grieves et al. |
| 8,855,423 B2 | 10/2014 | Boncyk et al. |
| 8,868,638 B2 | 10/2014 | Scoda |
| 8,903,978 B2 | 12/2014 | Zerr et al. |
| 8,935,364 B2 | 1/2015 | Teraguchi |
| 8,983,935 B2 | 3/2015 | Scoda |
| 8,984,164 B2 | 3/2015 | Scoda |
| 8,990,392 B1 | 3/2015 | Stamos |
| 9,003,423 B1 | 4/2015 | Rodriguez et al. |
| 9,009,784 B2 | 4/2015 | Chen et al. |
| 9,146,675 B2 | 9/2015 | Chen et al. |
| 9,208,783 B2 | 12/2015 | Ativanichayaphong et al. |
| 9,268,753 B2 | 2/2016 | Hendry et al. |
| 9,275,023 B2 | 3/2016 | Scoda |
| 9,311,281 B2 | 4/2016 | Scoda |
| 9,319,244 B2 | 4/2016 | Taylor et al. |
| 9,356,574 B2 | 5/2016 | Denninghoff |
| 9,384,183 B2 | 7/2016 | Kasa et al. |
| 9,473,592 B2 | 10/2016 | Scoda |
| 9,489,131 B2 | 11/2016 | Seymour et al. |
| 9,514,238 B2 | 12/2016 | Blitzstein |
| 9,547,633 B2 | 1/2017 | Scoda |
| 9,569,795 B1 | 2/2017 | Shin et al. |
| 9,575,624 B2 | 2/2017 | Voorhees et al. |
| 9,632,800 B1 | 4/2017 | Chorley et al. |
| 9,715,557 B2 | 7/2017 | Kim et al. |
| 9,727,660 B2 | 8/2017 | Barrell et al. |
| 9,736,245 B2 | 8/2017 | Scoda |
| 9,736,524 B2 | 8/2017 | Aravamudan et al. |
| 9,767,487 B2 | 9/2017 | Schechter et al. |
| 9,811,602 B2 | 11/2017 | Dewar et al. |
| 9,846,572 B2 | 12/2017 | Scoda |
| 9,846,686 B2 | 12/2017 | Scoda |
| 9,865,261 B2 | 1/2018 | Goenka et al. |
| 9,875,671 B2 | 1/2018 | Gharpure et al. |
| 9,876,776 B2 | 1/2018 | Scoda |
| 9,971,636 B2 | 5/2018 | Scoda et al. |
| 9,996,613 B2 | 6/2018 | Jadhav et al. |
| 10,015,226 B2 | 7/2018 | Scoda et al. |
| 10,037,318 B2 | 7/2018 | Liu |
| 10,049,089 B2 | 8/2018 | Scoda et al. |
| 10,116,726 B2 | 10/2018 | Scoda |
| 10,120,847 B2 | 11/2018 | Scoda |
| 10,141,006 B1 | 11/2018 | Burciu |
| 10,198,414 B2 | 2/2019 | Scoda |
| 10,218,775 B2 | 2/2019 | Scoda |
| 10,222,942 B1 | 3/2019 | Zeiler |
| 10,237,334 B2 | 3/2019 | Alexander et al. |
| 10,276,148 B2 | 4/2019 | Fleizach et al. |
| 10,282,401 B2 | 5/2019 | Scoda |
| 10,311,751 B2 | 6/2019 | Beranek |
| 10,318,095 B2 | 6/2019 | Harrison et al. |
| 10,331,756 B2 | 6/2019 | Chen et al. |
| 10,394,579 B2 | 8/2019 | Nandakumar et al. |
| 10,402,159 B1 | 9/2019 | Darrah et al. |
| 10,423,709 B1 | 9/2019 | Bradley et al. |
| 10,425,501 B2 | 9/2019 | Nasson et al. |
| 10,444,934 B2 | 10/2019 | Bradley et al. |
| 10,452,730 B2 | 10/2019 | Scoda |
| 10,452,758 B1 | 10/2019 | Bhowmick |
| 10,481,752 B2 | 11/2019 | Latheef et al. |
| 10,552,236 B2 | 2/2020 | Pahlavan Yali et al. |
| 10,642,468 B2 | 5/2020 | Guido et al. |
| 10,671,520 B1 | 6/2020 | Rodrigues et al. |
| 10,749,885 B1 | 7/2020 | Hoorvitch et al. |
| 10,739,984 B1 | 8/2020 | Apicella |
| 10,761,804 B2 | 9/2020 | Miron |

(56) References Cited

U.S. PATENT DOCUMENTS

| | | |
|---|---|---|
| 10,762,280 B2 | 9/2020 | Bradley et al. |
| 10,809,877 B1 | 10/2020 | Bradley et al. |
| 10,845,946 B1 | 11/2020 | Bradley et al. |
| 10,845,947 B1 | 11/2020 | Bradley et al. |
| 10,860,173 B1 | 12/2020 | Bradley et al. |
| 10,866,691 B1 | 12/2020 | Bradley et al. |
| 10,867,120 B1 | 12/2020 | Bradley et al. |
| 10,896,286 B2 | 1/2021 | Bradley et al. |
| 10,928,978 B2 | 2/2021 | Bradley et al. |
| 10,997,361 B1 | 5/2021 | Bradley et al. |
| 11,029,815 B1 | 6/2021 | Bradley et al. |
| 11,061,532 B2 | 7/2021 | Bradley et al. |
| 11,080,469 B1 | 8/2021 | Bradley et al. |
| 11,151,304 B2 | 10/2021 | Bradley et al. |
| 11,157,682 B2 | 10/2021 | Bradley et al. |
| 11,194,884 B2 | 12/2021 | Brunet et al. |
| 11,455,458 B2 | 9/2022 | Bradley et al. |
| 2002/0003547 A1 | 1/2002 | Wang |
| 2002/0007379 A1 | 1/2002 | Wang |
| 2002/0010584 A1 | 1/2002 | Schultz et al. |
| 2002/0010715 A1 | 1/2002 | Chinn et al. |
| 2002/0023020 A1 | 2/2002 | Kenyon et al. |
| 2002/0065658 A1 | 5/2002 | Kanevsky et al. |
| 2002/0074396 A1 | 6/2002 | Rathus et al. |
| 2002/0122053 A1 | 9/2002 | Dutta |
| 2002/0124020 A1 | 9/2002 | Janakiraman et al. |
| 2002/0124025 A1 | 9/2002 | Janakiraman et al. |
| 2002/0156799 A1 | 10/2002 | Markel et al. |
| 2002/0158903 A1 | 10/2002 | Janakiraman et al. |
| 2002/0194388 A1 | 12/2002 | Boloker et al. |
| 2002/0198705 A1 | 12/2002 | Burnett |
| 2003/0033434 A1 | 2/2003 | Kavacheri et al. |
| 2003/0098803 A1 | 5/2003 | Gourgey et al. |
| 2003/0115546 A1 | 6/2003 | Dubey et al. |
| 2003/0140097 A1 | 7/2003 | Schloer |
| 2003/0158737 A1 | 8/2003 | Csicsatka |
| 2004/0002808 A1 | 1/2004 | Hashimoto et al. |
| 2004/0006478 A1 | 1/2004 | Alpdemir et al. |
| 2004/0056882 A1 | 3/2004 | Foreman et al. |
| 2004/0128136 A1 | 7/2004 | Irani |
| 2004/0148568 A1 | 7/2004 | Springer |
| 2004/0158429 A1 | 8/2004 | Bary et al. |
| 2004/0218451 A1 | 11/2004 | Said et al. |
| 2004/0254988 A1 | 12/2004 | Rodriguez |
| 2005/0108338 A1 | 5/2005 | Simske et al. |
| 2005/0160065 A1 | 7/2005 | Seeman |
| 2005/0195077 A1 | 9/2005 | McCulloch et al. |
| 2006/0212466 A1 | 9/2006 | Hyder et al. |
| 2007/0100628 A1 | 5/2007 | Bodin et al. |
| 2008/0133500 A1 | 6/2008 | Edwards et al. |
| 2008/0168049 A1 | 7/2008 | Gao et al. |
| 2008/0208593 A1 | 8/2008 | Ativanichayaphong et al. |
| 2008/0235564 A1 | 9/2008 | Erol et al. |
| 2009/0319927 A1 | 12/2009 | Beeman et al. |
| 2010/0070872 A1 | 3/2010 | Trujillo |
| 2010/0114578 A1 | 5/2010 | Yuen et al. |
| 2010/0166165 A1 | 7/2010 | Langseth et al. |
| 2010/0205523 A1 | 8/2010 | Lehota et al. |
| 2010/0251217 A1 | 9/2010 | Miller |
| 2011/0154212 A1 | 6/2011 | Gharpure et al. |
| 2011/0252356 A1 | 10/2011 | Morris |
| 2011/0295623 A1 | 12/2011 | Behringer et al. |
| 2011/0307855 A1 | 12/2011 | Scoda et al. |
| 2012/0116872 A1 | 5/2012 | Hicken et al. |
| 2012/0176509 A1 | 7/2012 | Aravamudan et al. |
| 2012/0216243 A1 | 8/2012 | Gill et al. |
| 2012/0239405 A1 | 9/2012 | O'Conor et al. |
| 2012/0240045 A1 | 9/2012 | Bradley et al. |
| 2012/0254723 A1 | 10/2012 | Kasa et al. |
| 2012/0272132 A1 | 10/2012 | Mondal et al. |
| 2012/0322384 A1 | 12/2012 | Zerr et al. |
| 2013/0073949 A1 | 3/2013 | Barrell et al. |
| 2013/0104029 A1 | 4/2013 | Hendry et al. |
| 2013/0305139 A1 | 11/2013 | Scoda |
| 2013/0332815 A1 | 12/2013 | Gallo et al. |
| 2014/0025949 A1 | 1/2014 | Kay et al. |
| 2014/0047337 A1 | 2/2014 | Bradley et al. |
| 2014/0063070 A1 | 3/2014 | Leventhal et al. |
| 2014/0149447 A1 | 5/2014 | Scoda |
| 2014/0164352 A1 | 6/2014 | Denninghoff |
| 2014/0180846 A1 | 6/2014 | Meron |
| 2014/0195653 A1 | 7/2014 | Alexander et al. |
| 2014/0365860 A1 | 12/2014 | Spielberg et al. |
| 2014/0380149 A1 | 12/2014 | Gallo et al. |
| 2015/0067342 A1 | 3/2015 | Pazdziora et al. |
| 2015/0106686 A1 | 4/2015 | Blitzstein |
| 2015/0113410 A1 | 4/2015 | Bradley et al. |
| 2015/0156084 A1 | 6/2015 | Kaminsky |
| 2015/0286658 A1 | 10/2015 | Folkens et al. |
| 2015/0319215 A1 | 11/2015 | Scoda |
| 2015/0370815 A1 | 12/2015 | Lee |
| 2016/0306784 A1 | 10/2016 | Bradley et al. |
| 2016/0337426 A1 | 11/2016 | Shribman et al. |
| 2017/0063653 A1 | 3/2017 | Kieviet et al. |
| 2017/0111431 A1 | 4/2017 | Scoda et al. |
| 2017/0371975 A1 | 12/2017 | Chen et al. |
| 2018/0075488 A1 | 3/2018 | Celik et al. |
| 2018/0165258 A1 | 6/2018 | Scoda |
| 2018/0191764 A1 | 7/2018 | Chawla et al. |
| 2018/0239516 A1 | 8/2018 | Scoda |
| 2018/0267847 A1 | 9/2018 | Smith et al. |
| 2018/0293504 A1 | 10/2018 | Meruva et al. |
| 2018/0336356 A1 | 11/2018 | Papaxenopoulos et al. |
| 2018/0349004 A1 | 12/2018 | Scoda et al. |
| 2019/0075081 A1 | 3/2019 | Adam et al. |
| 2019/0340212 A1 | 11/2019 | Isager |
| 2022/0121723 A1 | 4/2022 | Page et al. |

FOREIGN PATENT DOCUMENTS

| | | |
|---|---|---|
| CA | 2800790 A1 | 12/2011 |
| CA | 2807320 A1 | 2/2012 |
| CA | 2811207 A1 | 3/2012 |
| CA | 2816336 A1 | 5/2012 |
| CA | 2816338 A1 | 5/2012 |
| CA | 2821769 A1 | 6/2012 |
| CA | 2839013 A1 | 1/2013 |
| CA | 2861602 A1 | 8/2013 |
| CA | 2824861 A1 | 3/2014 |
| CA | 2834466 A1 | 5/2014 |
| CA | 2843938 A1 | 9/2014 |
| CA | 2845279 A1 | 9/2014 |
| CA | 2848175 A1 | 10/2014 |
| CA | 2855420 A1 | 1/2015 |
| CA | 2858590 A1 | 2/2015 |
| CA | 2868162 A1 | 5/2015 |
| CA | 2947402 A1 | 11/2015 |
| CA | 2958235 A1 | 3/2016 |
| CA | 2963393 A1 | 4/2016 |
| CA | 2716635 C | 11/2016 |
| CA | 2944659 A1 | 4/2017 |
| CA | 2951659 A1 | 6/2017 |
| CA | 2839006 C | 8/2017 |
| CA | 2732540 C | 2/2018 |
| EP | 2738696 A1 | 6/2014 |
| EP | 2656303 A4 | 7/2014 |
| EP | 2778975 A1 | 9/2014 |
| EP | 2787454 A1 | 10/2014 |
| EP | 2827261 A1 | 1/2015 |
| EP | 2851813 A1 | 3/2015 |
| EP | 2732385 A4 | 4/2015 |
| EP | 2869222 A1 | 5/2015 |
| EP | 2363995 B1 | 7/2015 |
| EP | 2807578 A4 | 11/2015 |
| EP | 2724253 A4 | 4/2016 |
| EP | 2580699 A4 | 7/2016 |
| EP | 2580686 A4 | 11/2016 |
| EP | 2638683 B1 | 3/2017 |
| EP | 3156919 A1 | 4/2017 |
| EP | 3185145 A1 | 6/2017 |
| EP | 2638681 B1 | 7/2017 |
| EP | 2606436 A4 | 11/2017 |
| EP | 2778976 B1 | 12/2017 |
| EP | 3140733 A4 | 12/2017 |

(56) References Cited

FOREIGN PATENT DOCUMENTS

| | | |
|---|---|---|
| EP | 2616962 A4 | 1/2018 |
| EP | 2476063 A4 | 2/2018 |
| EP | 3195136 A4 | 4/2018 |
| EP | 3204874 A4 | 7/2018 |
| EP | 2724251 B1 | 8/2018 |
| WO | WO 2001/075678 | 10/2001 |
| WO | WO 2006/065877 | 6/2006 |
| WO | WO2009111251 A1 | 9/2009 |
| WO | WO2011031868 A1 | 3/2011 |
| WO | WO2011156739 A2 | 12/2011 |
| WO | WO2011156743 A2 | 12/2011 |
| WO | WO2012024380 A3 | 6/2012 |
| WO | WO2012064857 A3 | 9/2012 |
| WO | WO2012088326 A9 | 9/2012 |
| WO | WO2012064856 A3 | 10/2012 |
| WO | WO2012036833 A9 | 12/2012 |
| WO | WO2012178167 A3 | 2/2013 |
| WO | WO2013003455 A3 | 3/2013 |
| WO | WO2013112285 A1 | 8/2013 |
| WO | WO 2013/184273 | 12/2013 |
| WO | WO2014040080 A1 | 3/2014 |
| WO | WO2015171228 A1 | 11/2015 |
| WO | WO2016032602 A1 | 3/2016 |
| WO | WO2016057092 A1 | 4/2016 |
| WO | WO 2017/161008 | 9/2017 |

OTHER PUBLICATIONS

Le Hégaret P. et al., What is the Document Object Model? (Apr. 9, 2002), available at https://www.w3.org/TR/2002/WD-DOM-Level-3-Core-20020409/introduction.html; 8 pages.

Introduction to XML and XML with JAVA, Nov. 8, 2005, originally available at http://totheriver.com/learn/xml/xmltutorial.html in 27 pages.

Java, "XML Processing" (2004), available at https://web.mit.edu/java_v1.5.0_22/distrib/share/docs/guide/xml/jaxp/index.html, in 3 pages.

JAVA2 Platform Standard Edition 5.0 API Specification, downloaded on Aug. 29, 2022; available at https://web.mit.edu/java_v1.5.0_22/distrib/share/docs/api/index.html, in 5 pages.

JAVA2 Platform Standard Edition 5.0 API Specification, downloaded on Sep. 1, 2022; available at https://web.mit.edu/java_v1.5.0_22/distrib/share/docs/api/index.html, in 9 pages.

Scale, "CSS: Cascading Style Sheets / MDN", last updated Jun. 11, 2022, available at https://developer.mozilla.org/en-US/docs/WebCSS/transform-function/scale, in 5 pages.

Takagi et al., Collaborative web accessibility improvement: challenges and possibilities. In Proceedings of the 11th International ACM SIGACCESS Conference on Computers and Accessibility, Oct. 25, 2009; pp. 195-202.

W3C, "Introduction to Web Accessibility", Last visited Aug. 31, 2021, available at: https://www.w3.org/WAI/fundamentals/accessibility-intro/, in 8 pages.

W3C, Accessible Rich Internet Applications (WAI-ARIA) 1.0 (2014) available at https://www.w3.org/TR/wai-aria-1.0/states_and_properties in 32 pages.

W3C, A vocabulary and associated APIs for HTML and XHTML W3C (Working Draft) Apr. 5, 2011; available at https://www.w3.org/TR/2011/WD-HTM15-20110405/, in 19 pages.

W3C, "Cascading Style Sheets, level 2 CSS2 Specification", May 12, 1998; available at https://www.w3.org/TR/1998/REC-CSS2-19980512/Overview.html, in ?? Pages.

W3C, "Package.org.w3c.dom: Interface for DOM"; (2004) originally available at https://web.mit.edu/java_v1.5.0_22/distrib/share/docs/api/org/w3c/dom/package-summary-html, in 3 pages.

W3C, "5.1.2 Request-URI" part of Hypertext Transfer Protocol—HTTP/1.1., available at https://www.w3.org/Protocols/rfc2616/rfc2616-sec5.html, in 3 pages.

W3C, "The ALT-server (An eye for an alt)", Jul.-Jan. 1998), originally available at https://www.23.org/WAI/altserv.htm, in 9 pages.

w3schools.com, "CSS transform property", downloaded on Jan. 9, 2022; available at https://www.w3schools.com/cssref/css3_pr_transform.asp in 8 pages.

WEBVISUM-1, Jul. 7, 2008, originally available at http://www.webvisum.com, in 2 pages.

WEBVISUM-2, "Review of the WebVisum Firefox extension"; Jul. 3, 2008, originally available at http://www.marcozehe.de/2008/07/03/review-of-the-webvisum-firefox-extension/, currently availabe at http://web.archive.org/web/20080902031833/http:/www.marcozehe.de/2008/07/03/review-of-the-webvisum-firefox-extension/, in 14 pages.

Zoom, "CSS: Cascading Style Sheets / MDN", last updated Aug. 30, 2022; available at https://developer.mozilla.org/en-US/docs/Web/CSS/zoom in 5 pages.

Petition for Inter Partes Review of U.S. Pat. No. 10,997,361 filed Sep. 6, 2022 in 86 pages.

Petition for Inter Partes Review of U.S. Pat. No. 10,928,978 filed Sep. 6, 2022 in 87 pages.

Petition for Inter Partes Review of U.S. Pat. No. 11,061,532 filed Sep. 7, 2022 in 96 pages.

Petition for Inter Partes Review of U.S. Pat. No. 11,080,469 filed Sep. 7, 2022 in 96 pages.

U.S. Appl. No. 16/991,392, filed Aug. 12, 2020 Bradley et al.
U.S. Appl. No. 16/991,381, filed Aug. 12, 2020 Bradley et al.
U.S. Appl. No. 16/991,434, filed Aug. 12, 2020 Bradley et al.
U.S. Appl. No. 16/991,505, filed Aug. 12, 2020 Bradley et al.
U.S. Appl. No. 16/991,578, filed Aug. 12, 2020 Bradley et al.
U.S. Appl. No. 17/447,680, filed Sep. 14, 2021 Bradley et al.

Alor-Hernandez et al., "Towards Dynamic Representation of Rich Internet Applications through Web Service Invocation," 2009 Second International Conference on Advances in Human-Oriented and Personalized Mechanisms, Technologies, and Services, Porto, Portugal, 2009, pp. 33-38.

Al Oudat et al., "A Survey of Image Retrieval Techniques for Search Engine", International Journal of Scientific & Engineering Research, Jul. 2015, vol. 6, Issue 7, pp. 1868-1888.

Amalfitano et al., "An Interactive Approach for the Reverse Engineering of Rich Internet Application User Interfaces," 2010 Fifth International Conference on Internet and Web Applications and Services, Barcelona, Spain, 2010, pp. 401-410.

Bigham et al., "WebInSight: Making Web Images Accessible", Proceedings of the 8th International ACM SIG ACCESS Conference on Computers and Accessibility, 2006, pp. 181-188.

Bigham, "Increasing Web Accessibility by Automatically Judging Alternative Text Quality", 12th International Conference on Intelligent User Interfaces, IUI 2007, Honolulu, Hawaii, USA, pp. 349-352, alleged to be available at https://dl.acm.org/doi/10.1145/1216295.1216364.

Bureau of Internet Accessibility [BOIA] "History of the Web Content Accessibility Guidelines (WCAG)", dated May 6, 2019 in 4 pages; alleged to be available at: https://www.boia.org/blog/history-of-the-web-content-accessibility-guidelines-wcag in 4 pages.

Brunet et al., "Accessibility requirements for systems design to accommodate users with vision impairments", IBM Systems Journal, 2005, 44(3): 445-466.

Cundiff C., Alt Text Bot, DevPost, alleged to be available at: https://devpost.com/software/alt-text-bot-hgzu, downloaded Apr. 8, 2021 in 6 pages.

Dove, CamFind Launches CloudSight API for Multiplatform Visual Search Functionality, The Next Web alleged to be available at https://thenextweb.com/creativity /2015/02/24/camfind- launches-cloudsight-api-for-multiplatform-visual-search-functionality/ in 4 pages.

Iaccarino et al., "Personalizable Edge Services for Web Accessibility", Univ Access Inf Soc 6, 2007, pp. 285-306 https://doi.org/10.1007/s10209-007-0091-y.

Image Searcher, Inc., "CamFind—The First Visual Search Engine Goes Social", PR Newswire Apr. 16, 2015 in 5 pages; alleged to be available at https://www.pmewswire.com/news-releases/camfind---the- first-visual-search-engine-goes-social-300067412.html in 5 pages.

Janakiram, MSV, Google Cloud Vision API Delivers Sophisticated Image Recognition Service to Developers, Forbes Magazine alleged to be available at: https://www.forbes.com/sites/janakirammsv/2015/12/03/google-cloud-vision-api-delivers-sophisticated-image-recognition-service-to-developers/?sh=4f7706bc6d22 in 4 pages.

(56) References Cited

OTHER PUBLICATIONS

Kar S., AlchemyAPI Releases API based AI Image Processing AlchemyVision, SiliconAngle, May 20, 2014; alleged to be available at https://siliconangle.com/2014/05/20/alchemyapi-releases-api-based-ai-image-processing-alchemyvision/ in 8 pages.

Kneser et al., "Toward Knowledge-Enhanced Viewing Using Encyclopedias And Model-Based Segmentation", Proc. SPIE 7260, Medical Imaging 2009: Computer-Aided Diagnosis, 72601D; doi: 10.1117/12.811587 in 10 pages.

Maeda et al., "Web accessibility technology at the IBM Tokyo Research Laboratory", IBM Journal of Research and Development, Nov. 2004, 48(5/6): 735-749 http://dialog.proquest.com/professional/docview/220685504?accountid=157282.

Novet J., "How Stephen Wolfram's Image-Recognition Tool Performs Against 5 Alternatives", VentureBeat alleged to be available at https://venturebea t.com/2015/05/16/how-stephen-wolframs-image-recognition-tool-pefrorms-against-5-alternatives/ in 10 pages.

Sato et al., "Accessibility Evaluation based on Machine Learning Technique", Oct. 22-25, 2006, Portland, Oregon, USA, ACM, in 2 pages (Year: 2006).

Schiavone et al., "An extensible environment for guideline-based accessibility evaluation of dynamic Web applications", Univ Access Inf Soc., Jan. 2015, 22 pages.

Sensus Internet Browser, printed from www/sensus.dk/sibl0uk.htm on Jul. 23, 2002.

Shadi et al., "Artificial Intelligence for Web Accessibility-Conformance Evaluation as a Way Forward?", Apr. 23-25, 2018, Lyon, France, ACM, p. 5 (Year: 2018) in 5 pages.

W3C, "Document Object Model (DOM) Level 1 Specification v1.0", W3C Recommendation Oct. 1, 1998 ("W3C DOM") in 169 pages.

W3C, "Web Content Accessibility Guidelines 1.0", W3C Recommendation, May 5, 1999 in 34 pages.

W3C, "Techniques for Web Content Accessibility Guidelines 1.0", W3C Note (WCAG Techniques v1.0) Nov. 6, 2000, in 23 pages.

W3C, "Web Content Accessibility Guidelines (WCAG) v2.0" (WCAG 2.0), W3C Recommendation, Dec. 11, 2008, in 29 pages.

W3C, "Mobile Accessibility: How WCAG 2.0 and Other W3C/WAI Guidelines Apply to Mobile", W3C First Public Working Draft Feb. 26, 2015; alleged to be available at: https://www.w3.org /TR/mobile-accessibility-mapping/ in 14 pages.

W3C, "Web Accessibility Evaluation Tools List", downloaded May 10, 2021; alleged to be available at: https://www.w3.org /TR/ mobile- accessibility-mapping/ in 23 pages.

European Search Report and Written Opinion of EP 17767449.6 dated Oct. 15, 2019 in 10 pages.

International Preliminary Report on Patentability dated Jan. 25, 2019 for International Application No. PCT/US2017/022542 in 36 pages.

International Search Report and Written Opinion of PCT/US17/22542 dated Jun. 20, 2017 in 10 pages.

International Search Report and Written Opinion of PCT/US2019/046361 dated Dec. 5, 2019 in 17 pages.

*Audioeye, Inc.* v. *accessiBe Ltd.*, Case No. 6:20-cv-00997-ADA (W.D. Tex.), [Document No. 33], Defendant accessiBe Ltd.'s Opening Claim Construction Brief, filed Aug. 13, 2021 in 55 pages.

Petition for Inter Partes Review of U.S. Pat. No. 10,444,934 filed May 12, 2021 in 90 pages.

Declaration of Scott Delman dated Apr. 27, 2021 in support of Petition for IPR review of U.S. Pat. No. 10,444,934 in 2 pages.

Declaration of Dr. James Fogarty dated May 12, 2021 in support of Petition for Inter Partes Review of U.S. Pat. No. 10,444,934 in 158 pages.

Berners-Lee et al., "RFC 1738: Uniform Resource Locators (URL)", Proposed Standard—Dec. 1994; in 29 pages.

Clarifai, Inc., "Bring the Future into Focus with our World Class Visual Recognition System", May 15, 2015 WayBackMachine Date; in 4 pages.

Fielding et al., "Hypertext Transfer Protocol—HTTP/1.1", Network Working Group; The Internet Society (1999) in 4 pages.

Nguyen et al., "Learning to Extract Form Labels", Very Large Data Base Conference (VLDB), Aug. 24-30, 2008 Auckland, New Zealand in 11 pages.

Venugopalan et al., "Sequence to Sequence—Video to Text", Computer Vision Foundation IEEE Xplore, In Proceedings of the IEEE International Conference on Computer Vision (ICCV), 2015, pp. 4534-4542.

W3C, "HTML 4.0 Specification" [Excerpts]; W3C Recommendation, revised on Apr. 24, 1998 downloaded from http://www.w3.org/TR/1998/REC-html40-19980424/ in 20 pages.

W3C, "HTML Techniques for Web Content Accessibility Guidelines 1.0", W3C Note, Nov. 6, 2000 in 56 pages.

W3C, "Supported States and Properties", Chapter 6 in Accessible Rich Internet Applications 1.0; WayBackMachine Jan. 14, 2015, available at https://web.archive.org/web/20150114075748/http://www.w3.org/TR/wai-aria/states_and_properties#aria-label/ in 41 pages.

W3C, "Introduction to Web Accessibility", Web Accessibility Initiative (WAI) available at https://www.w3.org/WAI/fundamentals/accessibility-intro/ downloaded Dec. 4, 2021 in 6 pages.

W3C, "W3C Accessibility Standards Overview", Web Accessibility Initiative (WAI) available at https://www.w3.org/WAI/standards-guidelines/ downloaded Dec. 4, 2021 in 5 pages.

w3schools.com, "HTML Global Hidden Attribute", WayBackMachine Jan. 15, 2015, available at https://web.archive.org/web/20150115050246/http://www.w3schools.com/tags/att_global_hidden.asp in 4 pages.

w3schools.com, "HTML <input> name Attribute", WayBackMachine Jan. 15, 2015, available at https://web.archive.org/web/20150115063533/http://www.w3schools.com/tags/att_input_name.asp in 4 pages.

w3schools.com, "HTML <input> placeholder Attribute", WayBackMachine Jan. 15, 2015, available at https://web.archive.org/web/20150115063535/http://www.w3schools.com/tags/att_input_placeholder.asp in 4 pages.

w3schools.com, "HTML <p> Tag", WayBackMachine Jan. 15, 2015, available at https://web.archive.org/web/20150115043456/http://www.w3schools.com/tags/tag_p.asp in 4 pages.

w3schools.com, "HTML <span> Tag", WayBackMachine Jan. 15, 2015, available at https://web.archive.org/web/20150115043512/http://www.w3schools.com/tags/tag_span.asp in 4 pages.

w3schools.com, "HTML Input Types", WayBackMachine Jan. 15, 2015, available at https://web.archive.org/web/20150115041345/http://www.w3schools.com/html/html_form_input_types.asp in 11 pages.

*AudioEye, Inc.* v. *accessiBe Ltd.*, Case No. 6:20-cv-00924-LY (W.D. Tex.), Complaint—Infringement of U.S. Pat. Nos. 10,423,709, 10,444,934 and 10,762,280; filed Sep. 4, 2020 in 12 pages.

*AudioEye, Inc.* v. *accessiBe Ltd.*, Case No. 6:20-cv-00997-ADA (W.D. Tex.), First Amended Complaint—Infringement of U.S. Pat. Nos. 10,423,709, 10,444,934, 10,762,280, 10,809,877, 10,845,946 and 10,845,947; filed Dec. 2, 2020 in 46 pages.

*AudioEye, Inc.* v. *accessiBe Ltd.*, Case No. 6:20-cv-00997-ADA (W.D. Tex.), Second Amended Complaint—Infringement of U.S. Pat. Nos. 10,423,709, 10,444,934, 10,762,280, 10,809,877, 10,845,946, 10,845,947, 10,860,173, 10,866,691 and 10,867,120; filed Dec. 29, 2020 in 54 pages.

*AudioEye, Inc.* v. *accessiBe Ltd.*, Case No. 6:20-cv-00997-ADA (W.D. Tex.), Defendant accessiBe Ltd.'s Preliminary Invalidity Contentions, filed Jun. 25, 2021 in 1089 pages.

*AudioEye, Inc.* v. *accessiBe Ltd.*, Case No. 6:20-cv-00997-ADA (W.D. Tex.) [Document No. 069] Amended Claim Construction Order, dated Nov. 23, 2021 in 8 pages.

*AudioEye, Inc.* v. *accessiBe Ltd.*, Case No. 6:21-cv-00726-ADA (W.D. Tex.), Plaintiff's Preliminary Infringement Contentions, filed Oct. 14, 2021 in 165 pages.

*AudioEye, Inc.* v. *accessiBe Ltd.*, Case No. 6:21-cv-00726-ADA (W.D. Tex.), Defendant's Preliminary Invalidity Contentions, filed Dec. 9, 2021 in 29 pages.

*AudioEye, Inc.* v. *accessiBe Ltd.*, Case No. 6:21-cv-00726-ADA (W.D. Tex.), Defendant's Preliminary Invalidity Contentions, filed Dec. 9, 2021, Exhibit 1 [USP10896286] in 188 pages.

*AudioEye, Inc.* v. *accessiBe Ltd.*, Case No. 6:21-cv-00726-ADA (W.D. Tex.), Defendant's Preliminary Invalidity Contentions, filed Dec. 9, 2021, Exhibit 2 [USP10928978] in 124 pages.

(56) References Cited

OTHER PUBLICATIONS

*AudioEye, Inc.* v. *accessiBe Ltd.*, Case No. 6:21-cv-00726-ADA (W.D. Tex.), Defendant's Preliminary Invalidity Contentions, filed Dec. 9, 2021, Exhibit 3 [USP10997361] in 173 pages.

*AudioEye, Inc.* v. *accessiBe Ltd.*, Case No. 6:21-cv-00726-ADA (W.D. Tex.), Defendant's Preliminary Invalidity Contentions, filed Dec. 9, 2021, Exhibit 4 [USP 11029815] in 228 pages.

*AudioEye, Inc.* v. *accessiBe Ltd.*, Case No. 6:21-cv-00726-ADA (W.D. Tex.), Defendant's Preliminary Invalidity Contentions, filed Dec. 9, 2021, Exhibit 5 [USP 11061532] in 177 pages.

*AudioEye, Inc.* v. *accessiBe Ltd.*, Case No. 6:21-cv-00726-ADA (W.D. Tex.), Defendant's Preliminary Invalidity Contentions, filed Dec. 9, 2021, Exhibit 6 [USP 11080469] in 206 pages.

Petition for Inter Partes Review of U.S. Pat. No. 10,809,877 filed Dec. 1, 2021 in 89 pages.

Declaration of Dr. Sylvia Hall-Ellis dated Nov. 10, 2021 in support of Petition for Inter Partes Review of U.S. Pat. No. 10,809,877 in 24 pages.

Declaration of Dr. James Fogarty dated Nov. 30, 2021 in support of Petition for Inter Partes Review of U.S. Pat. No. 10,809,877 in 124 pages.

Petition for Inter Partes Review of U.S. Pat. No. 10,845,946 filed Dec. 7, 2021 in 102 pages.

Declaration of Dr. Sylvia Hall-Ellis dated Dec. 3, 2021 in support of Petition for Inter Partes Review of U.S. Pat. No. 10,845,946 in 33 pages.

Declaration of Dr. James Fogarty dated Dec. 3, 2021 in support of Petition for Inter Partes Review of U.S. Pat. No. 10,845,946 in 192 pages.

Petition for Inter Partes Review of U.S. Pat. No. 10,845,947 filed Dec. 7, 2021 in 105 pages.

Declaration of Dr. James Fogarty dated Dec. 6, 2021 in support of Petition for Inter Partes Review of U.S. Pat. No. 10,845,947 in 179 pages.

Petition for Inter Partes Review of U.S. Pat. No. 10,866,691 filed Dec. 15, 2021 in 110 pages.

Declaration of Dr. Sylvia Hall-Ellis dated Dec. 13, 2021 in support of Petition for Inter Partes Review of U.S. Pat. No. 10,866,691 in 41 pages.

Declaration of Dr. James Fogarty dated Dec. 15, 2021 in support of Petition for Inter Partes Review of U.S. Pat. No. 10,866,691 in 161 pages.

Petition for Inter Partes Review of U.S. Pat. No. 10,860,173 filed Dec. 15, 2021 in 112 pages.

Declaration of Dr. Sylvia Hall-Ellis dated Dec. 13, 2021 in support of Petition for Inter Partes Review of U.S. Pat. No. 10,860,173 in 59 pages.

Declaration of Dr. James Fogarty dated Dec. 14, 2021 in support of Petition for Inter Partes Review of U.S. Pat. No. 10,866,691 in 188 pages.

MODULAR SYSTEMS AND METHODS FOR SELECTIVELY ENABLING CLOUD-BASED ASSISTIVE TECHNOLOGIES

TECHNICAL FIELD

The present invention relates, generally, to systems and methods for selectively enabling cloud-based assistive technologies and, more particularly, to techniques for remediating websites and other graphical user interfaces to enhance the user experience for people with diverse abilities, in particular aging populations and individuals who have vision, hearing, motor, and intellectual disabilities, including those who are color blind, dyslexic, learning to read, and looking to maintain focus, or multi-task.

BACKGROUND

Screen reader software applications, or simply "screen readers," translate textual and graphical information displayed on a screen and re-present it to the user using synthesized speech, sound icons, and/or a refreshable Braille output device. Screen readers are a form of assistive technology (AT) potentially useful to the blind, visually impaired, color blind, low vision, dyslexic, illiterate or learning disabled, often in combination with other ATs such as screen magnifiers and tools for manipulating font type, font size, contrast, and the like.

Native screen readers include the Microsoft Narrator™ for Windows operating systems, Apple's VoiceOver™ for Mac OS X and iOS, and Google's TalkBack™ for Android operating systems. The console-based Oralux Linux ships with three console screen-reading environments: Emacspeak™, Yasr™, and Speakup™ Popular free and open source screen readers include the Orca™ for Unix-like systems and NonVisual Desktop Access (NVDA™) for Windows.

Other screen readers are packaged as separate commercial products such as JAWS™ (Job Access With Speech) from Freedom Scientific, Window-Eyes™ from GW Micro, Dolphin Supernova™ by Dolphin, System Access™ from Serotek, and ZoomText™ Magnifier/Reader from AiSquared.

The ReadSpeaker™ text-to-speech conversion tool available at ReadSpeaker.com speaks website text aloud, but does not allow the user to jump ahead, navigate thru, or otherwise interact with the site. Rather, the user experience is analogous to using a Kindle™ augmented with a screen reader, where the user is a passive listener. Brousealoud™ by texthelp.com and SiteCues by aiSquared allow the user to dynamically re-direct focus to the cursor while playing synthesized speech.

Presently known screen readers are limited, however, in that they do not have the ability to remediate sites which do not comply with industry recognized best practices, such as the Web Content Accessibility Guidelines (WCAG) 2.0, Accessible Rich Internet Applications (WAI-ARIA), Authoring Tool Accessibility Guidelines (ATAG), Section 508 Standards & Technical Requirements, and other existing and forthcoming national and international standards and guidelines such as those resources made available at https://www.w3.org/standards/webdesign/accessibility. In particular, the WCAG guidelines variously contemplate, inter alia, descriptive headings/labels (WCAG 2.4.6), proper form input labels (WCAG 1.1.1), appropriate link purposes (WCAG 2.4.4), and text alternatives for non-text content (WCAG 1.1.1).

Systems and methods are thus needed which overcome the limitations of prior art assistive technologies. Various features and characteristics will also become apparent from the subsequent detailed description and the appended claims, taken in conjunction with the accompanying drawings and this background section.

BRIEF SUMMARY

Various embodiments of the present invention relate to systems and methods for, inter alia: i) crawling and scanning websites to detect compliance issues relating to web accessibility best practices and standards (which may include but are not limited to WCAG); ii) providing a developer portal for manually fixing compliance issues, including access to libraries of preconfigured blocks of example remediation code; iii) programmatically fixing compliance issues and otherwise enhancing the user experience for people with diverse abilities, in particular aging populations and individuals who have vision, hearing, motor, and intellectual disabilities, including those who are color blind, dyslexic, learning to read, and looking to maintain focus, or multi-task; iv) remediating and enhancing websites and other user interfaces by injecting JavaScript (or similarly functioning code) at the website server, where the JavaScript is configured to manipulate the web page DOM to provide an enhanced, customizable user experience for individuals with disabilities; v) providing a modular suite of assistive technologies which may be independently or concurrently enabled, including a player module for converting text to audible speech, a reader module for manipulating font, contrast, and other visual attributes and for presenting a consistent, simplified and universally designed site and menu layout structure, a voice function to allow the user to interact with the content using voice commands, and a page elements menu module which allows a user to navigate through elements, including but not limited to headings, by dynamically inserting and extracting tab indices which function as page anchors; vi) using a secondary device to control a primary device in the context of assistive technologies; vii) selectively parsing a web page or other content to more efficiently perform text-to-speech conversion; viii) providing new or overriding existing alternative (alt) text, based on heuristics which may include known file paths and hyperlinks; ix) using artificial intelligence (AI) to provide alternative text for photographs, graphics, and videos and to provide audio descriptions of video content; x) periodically checking remediated code to determine if the remediation remains valid; xi) seamlessly integrating culturally appropriate voice fonts into text-to-speech (TTS) conversions based on contextual language tags; xii) using audio sprites to enhance TTS conversion for structured data; and xiii) persisting user interface preferences across diverse domains.

It should be noted that the various inventions described herein, while illustrated in the context of websites and stand-alone kiosks, are not so limited. Those skilled in the art will appreciate that the systems and methods described herein may contemplate any paradigm in which assistive technologies may be brought to bear to enhance the user experience for individuals with disabilities.

Moreover, while various embodiments are described as using AE JavaScript, it is understood that any approach which augments existing code to remediate compliance issues and integrate assistive technologies to enhance the user experience for individuals with disabilities is contemplated by the inventions described herein.

Various other embodiments, aspects, and features are described in greater detail below.

BRIEF DESCRIPTION OF THE DRAWING FIGURES

Exemplary embodiments will hereinafter be described in conjunction with the following drawing figures, wherein like numerals denote like elements, and:

Figure 12:
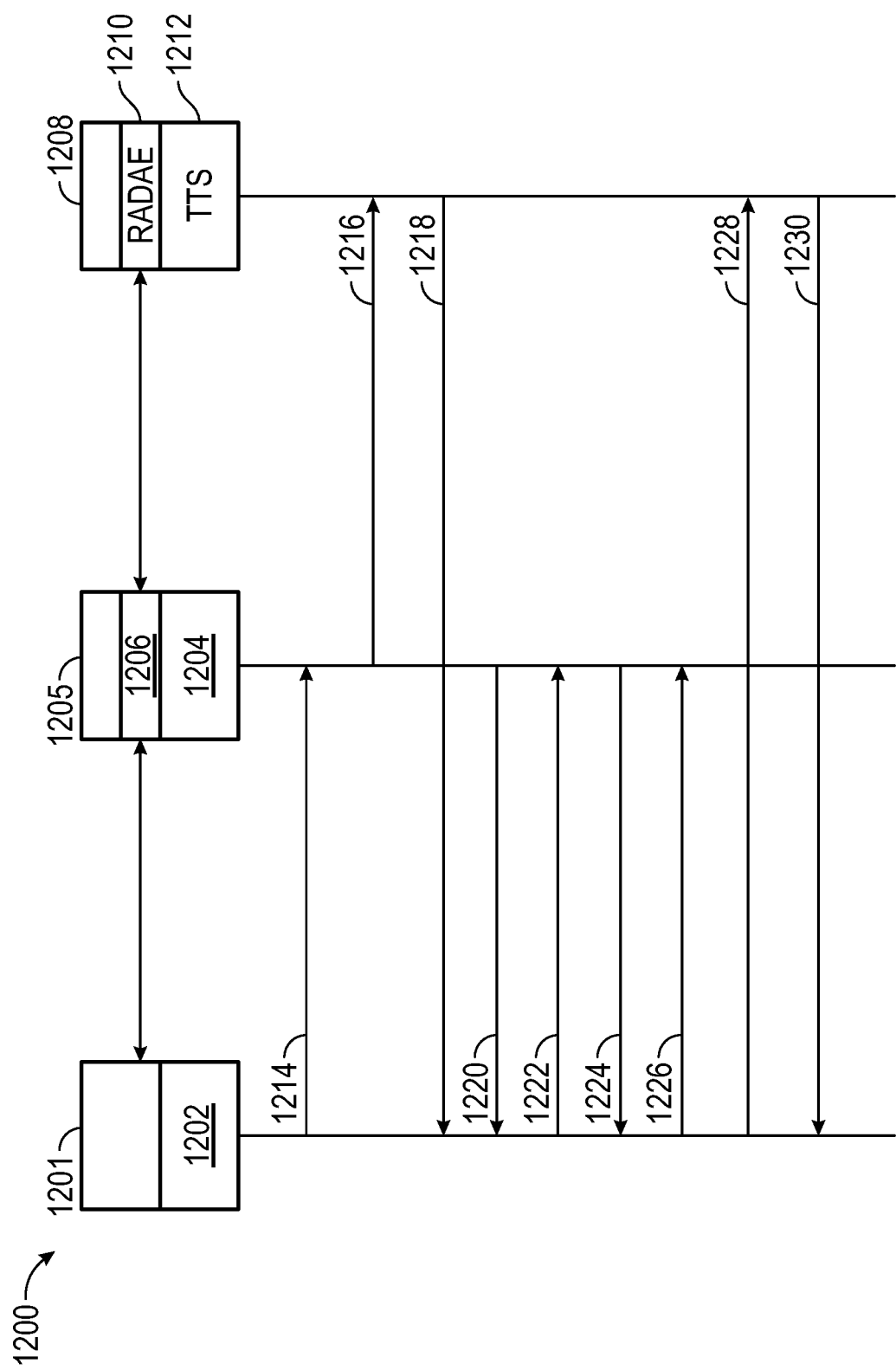
Figure 13:
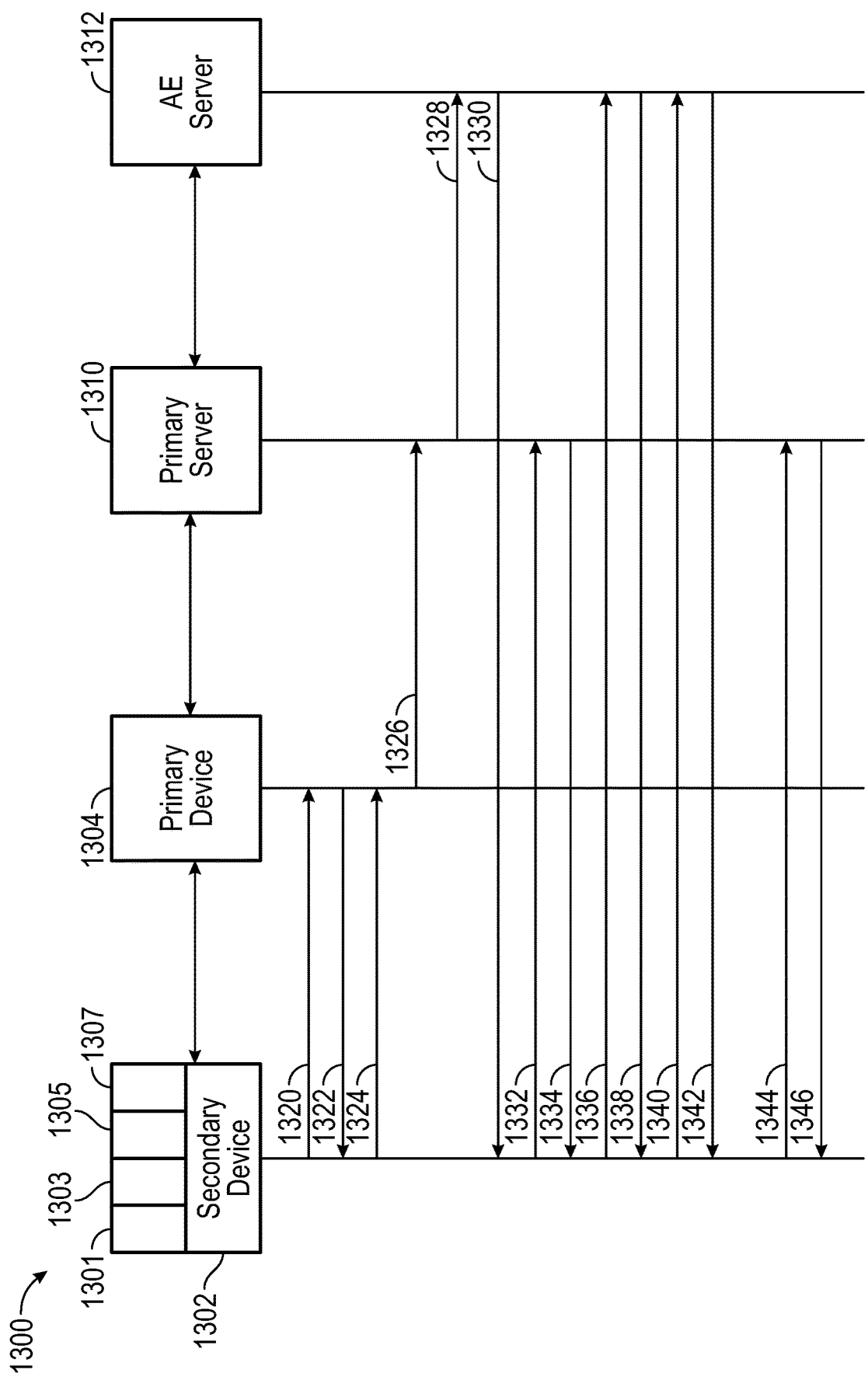

FIG. 12 is a combined schematic block and schematic flow sequence diagram illustrating an exemplary apparatus and method for rendering an AE JavaScript enhanced web page or other user interface in accordance with various embodiments; and FIG. 13 is a schematic block diagram and flow sequence diagram illustrating the use of a secondary device to control a primary device in accordance with various embodiments.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to systems and methods for bringing websites and other user interfaces into compliance with prevailing standards for accessibility by persons with disabilities. In various embodiments, this is accomplished by scanning the website and programmatically detecting issues in a robust and efficient manner, and injecting code into the HTML document object model (DOM) to facilitate both programmatically and manually remediating the issues, as described in greater detail below.

More particularly, web pages and other electronic documents accessible online (or otherwise accessible through a graphical user interface (GUI)) typically have an established reading order embodied in the DOM, including visual elements that are tagged with alternative text descriptions. The nodes of the document are organized in a tree structure, called the DOM tree. When an HTML page is rendered, the browser downloads the HTML into local memory and automatically parses it before displaying the page.

The W3C Document Object Model (DOM), a W3C (World Wide Web Consortium) standard for accessing documents, is a platform and language-neutral interface that allows programs and scripts (such as JavaScript) to dynamically access and update the content, structure, and style of a document. The HTML DOM is a standard object model and programming interface for HTML, and defines the properties of all HTML elements and the methods to access the HTML elements. In other words, the HTML DOM is a standard for how to get, change, add, delete, or otherwise interact with HTML elements.

In the context of the present invention, objects in the DOM tree may be addressed and manipulated by an integrated JavaScript code base available from AudioEye, Inc. (AE) at www.audioeye.com, sometimes referred to herein as the AE JavaScript. The AE JavaScript creates client-side interactivity with the objects in the DOM tree.

When an end-user accesses a website enabled with the techniques described herein, a version of the AE JavaScript is one of the components that loads on that page. When loaded, the JavaScript injects appropriate compliance fixes into the page. Conventional screen readers (such as JAWS, NVDA, or Voice Over) read and process the page, leveraging various compliance remediation techniques applied to the page. Specifically, the AE JavaScript checks for specific non-conformance issues and, if detected, programmatically fixes them.

In various embodiments, the AE JavaScript enhances the user experience using a series of secure communication links with cloud-based web services, in conjunction with various browser techniques. For example, a real-time auto-detection and audio enablement (RADAE) engine detects page content and element types. Through cascading style sheet (CSS) selector identification and techniques similar to x-path, the AE JavaScript recognizes individual HTML entities based on their placement within the DOM and their tag or other identifier. The AE JavaScript reorganizes the DOM elements into a strategically organized layout and then applies rules for enabling accessibility. In an embodiment, only page markup is altered, not the underlying content. In this way, the original version of the website remains unaltered when viewed without assistive technologies.

As the user requests page content, real-time TTS (text-to-speech) audio is generated through a secure, encrypted link with cloud-based services. Corresponding audio may be played back to the user using native browser functionality (e.g., a standard HTML5 audio player).

In an embodiment, the AE JavaScript may be placed in the global include (such as the footer include—just before the closing </body> tag). Once applied globally, a Call-to-Action icon may be appropriately displayed, for example in the bottom right hand corner of each page.

In a further embodiment, a website scan performed in accordance with the techniques described below provides publishers with access to compliance reports and remediation controls, allowing the publisher full control over their level of compliance without having to manipulate source code. This access may also include detailed analytics outlining the traffic details and user behaviors, including a log of communications associated with a Help Desk function to facilitate continuous site improvement.

In accordance with one aspect of the present invention, the system crawls (spiders) the website and gathers the pages to be analyzed in an initial evaluation phase. In this regard, various scanning parameters including maximum crawl time and level of recursion (sometimes referred to as page depth) may be configurable.

The system then pulls in each URL (page) and evaluates it for WCAG or similar compliance issues. For each identified compliance issue, the system either programmatically fixes the issue (also referred to herein as auto-remediation) or alerts a human to do so. For programmatic as well as manual fixes, the system may utilize one or more code blocks from one or more remediation libraries, for example in a dynamic link library (DLL), JavaScript object notation (JSON) format, database, or other structured storage mechanism.

The system suitably implements manual and programmatic remediations by first acquiring remediation code during the AE JavaScript loading process, and then applying appropriate remediation code to the rendered content. Remediation code may be acquired as part of the AE JavaScript's initial payload, from a specific URL, or from the AE hosting infrastructure. Remediations immediately manipulate the DOM, causing the corrections and enhancements to take effect at the time the content has finished loading and rendering. Keyboard users are able to use standard keys such as tab to navigate through the remediated page, regardless of whether or not a screen reader or other AT is being utilized, reaping the benefits of the applied DOM manipulations. For users that do not use a stand-alone or native screen reader, the AE JavaScript embodies a player function which may be configured to read the remediated page aloud, as described in greater detail below.

Figure 1:
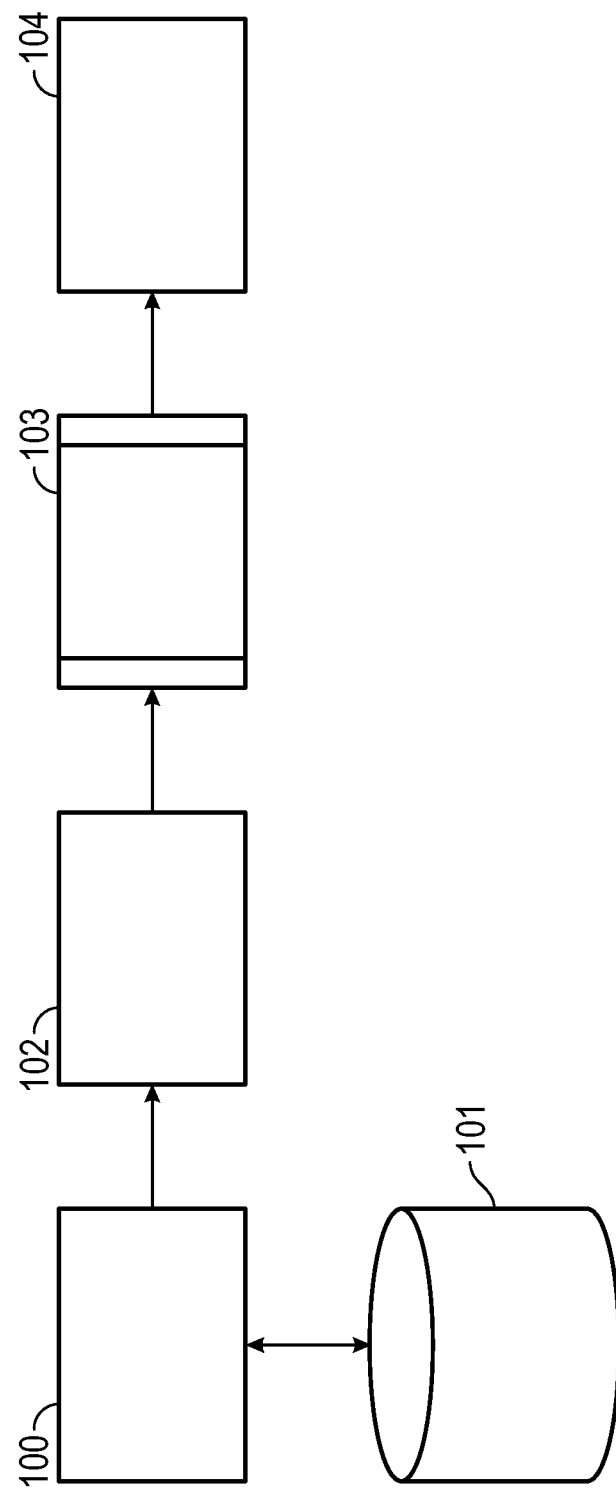
FIG. 1 is a schematic flow diagram of a web crawler process for scanning websites in accordance with various embodiments.

FIG. 1 is a schematic flow diagram of a crawler or "spider" process 100 capable of generating a list of URLs to be included as part of an initial compliance assessment (scan) of a website, in accordance with various embodiments. In particular, the crawler process 100 utilizes a configuration file to determine the depth of the scan (typically expressed in terms of page depth or levels of recursion), the maximum run time, and the starting URL. The starting URL is then added as the first element to a page stack (memory) 101.

With continued reference to FIG. 1, when the AE JavaScript commences the initial scanning phase, the process 100 reaches out to a bridge 102 that spawns a headless browser session (i.e. PhantomJS) 103. Successive URLs are then retrieved and rendered by a link extraction process 104, which detects all links within the rendered DOM and adds unique URLs to the stack 101. The process 100 retrieves successive URLs from the stack and continues crawling until the site is fully cataloged, timeout is reached, or page depth has been exhausted.

After the crawler or "spider" process completes, the scanning process initiates. The scanning process ingests a set of pages, which may be manually configured, attained via the foregoing crawl/spider process or a variant thereof, or from previous scans. Once ingested, the scanning process iterates through each unique URL, loading the page in a headless browser, applying the AE JavaScript, executing a series of tests, and ultimately delivering the results of the scan back to another process, system, or storage medium.

Once the website is scanned and initial fixes implemented (through the inclusion of the AudioEye JavaScript), site developers may access a development portal and attend to manual fixes, as discussed in greater detail below. Concurrently, users may access the remediated site and enjoy the resulting enhanced user experience even before manual remediation is complete.

Figure 2:
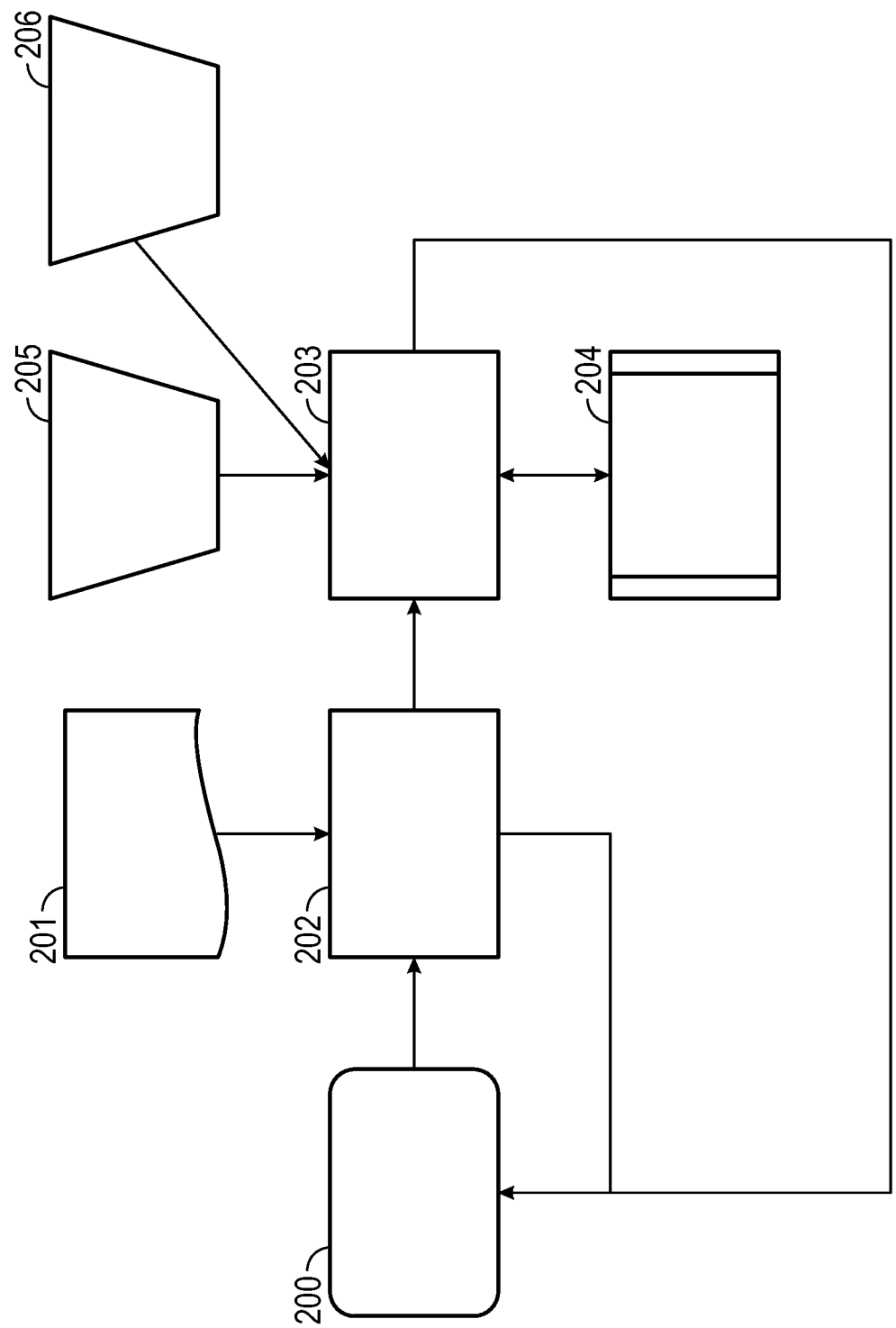
FIG. 2 is a schematic flow diagram of an exemplary process for real-time auto-detection and audio enablement (RADAE) of page content and element types in accordance with various embodiments.

More particularly and referring now to FIG. 2, the AE JavaScript may be configured to call a RADAE process 200 to initiate real-time auto-detection and audio enablement of page content. The process 200 loads a configuration file (e.g., JSON, XML) to identify the point at which content processing begins. Metadata 201 (e.g., JSON configuration metadata) surrounding the starting node 202 is passed back to the calling process. The process 200 may then request the next or previous item 203.

With continued reference to FIG. 2, a heuristics engine 204 determines which element should be presented back based on various factors including, inter alia: whether the node contains text; whether the node is visible; the relative position of the node on the DOM. Users may request the RADAE to move forward or backward through valid elements using the heuristics engine 204. Programmatic (e.g., AE JavaScript) 206 or user initiated 205 changes to the DOM cause the RADAE 200 to reevaluate the next or previous element contextually, using the heuristic engine 204.

Referring now to FIG. 12, a combined schematic block and schematic flow sequence diagram 1200 illustrates an exemplary apparatus and method for rendering a web page or other AE JavaScript enhanced user interface in accordance with various embodiments.

More particularly, the system includes a user device 1201 suitably equipped with a web browser 1202, a first server 1205 configured to host a website 1204 enhanced with an integrated AE JavaScript code base 1206, and a second server 1208 configured to host various processes and services accessible by the first server including a RADAE or analogously functional module 1210 and a TTS module 1212.

In accordance with various embodiments, the browser requests a web page (Task 1214) from the first server, whereupon the AE JavaScript retrieves the RADAE module (Task 1216) from the second server 1208 and returns the RADAE module to the user device 1201 for execution by the web browser 1202 (Task 1218). The first server also sends the HTML page and reorganized DOM to the browser (Task 1220). The browser then requests any additional resources (Task 1222), whereupon the AE JavaScript returns remediated page mark-up (Task 1224) and the remediated page is rendered.

With continued reference to FIG. 12, when the browser requests page content (Task 1226), such as a text-to-audio conversion, the AE JavaScript 1206 running in the local browser requests audio from the second server 120 (Task 1228), and the audio is passed directly back to the browser 1202 for playback to the user (Task 1230).

In an embodiment, the AE JavaScript facilitates a modular implementation of various ATs, including an audio player function, a screen reader tool suite (e.g., font, magnification, contrast), a voice command feature, and a page elements menu.

In accordance with another aspect of the invention, user preferences may be persisted across a plurality of domains enabled with the AE JavaScript. In particular, the AE JavaScript may be configured to place a cookie into the browser using an invisible iframe, so that when a user switches domains to another AE enabled site which also has an invisible iframe, the browser is informed that the previous AT preferences have been re-enabled for the new domain, thereby seamlessly enabling the AT functions and preferences (embedded in the browser cookie) across multiple domains without any additional user action. As a result, each time a user starts a new session on an AE JavaScript enabled site, the previous preferences are automatically invoked.

In accordance with a further aspect of the invention, the AE JavaScript may be configured to inject a branding icon (e.g., the AudioEye burst icon) into an enabled website (e.g., at the bottom right corner), suitably superimposing a timed toggle over the universal accessibility icon and using CSS and/or JavaScript to animate the image. A distinctive audible tone may also be played on the first or every visit to an enabled site as a further branding strategy. These are the visual and audio indicators to the user that the AE JavaScript is loaded and remediations have been applied. Hovering/Clicking on the burst reveals the AudioEye Ally+™ tool bar, which may include controls for independently enabling the player, the reader, the help desk, and any other desired functions.

In the context of the present invention, the "call to action" refers to when and how the system toggles from standard site interaction without the AE JavaScript enabled, to site interaction with the AE JavaScript enabled. Low vision keyboard users may tab thru or use keyboard shortcuts to navigate from link to link, with or without a screen reader, until they get to the enabling icon. Mouse users can mouse click directly on the enabling icon to reveal the tool bar and/or initiate the player module. Alternatively, AE JavaScript enabled websites allow the user to press the space bar (or other predetermined key or key combination) to reveal the enabling icon; pressing the escape key terminates execution of any active AE tool. In a further embodiment, pressing an alternative key or key combination (e.g., Alt+Shift+Space Bar) opens the AT tool bar but suppresses the audible player. This is a consequence of the modular approach contemplated by the present invention, as described in greater detail below.

More particularly, the AE JavaScript suitably implements a modular approach to a suite of assistive technologies, including graphical controls, and audible player, voice (microphone) control, and a page elements menu module. Each module is independent yet stackable upon the other modules. Prior art screen readers, on the other hand, tie the graphic controls to the audio component; that is, prior art systems highlight text as it is reads aloud, such that the only way to highlight text without also hearing it is to manually pause the audio component after enabling the visual component.

Once the AE JavaScript is enabled, the user may select the "Skip to main" option which allows keyboard users to drive focus to the main content within the web page, as suggested by WCAG best practices. Thereafter, the user may tab (or other trigger such as Ctrl R) to reveal the page elements menu which allows keyboard users to jump to content using any combination of at least the following page element menus: landmark navigation, page headings, hyperlinks, images, and the like. This can be done using the modular approach of the present invention either with the player (screen reader) function enabled, or silently for tab users who want to jump around the page. In contrast, prior art page element menus (or rotors) are only available if the audible screen reader is engaged.

Figure 3:
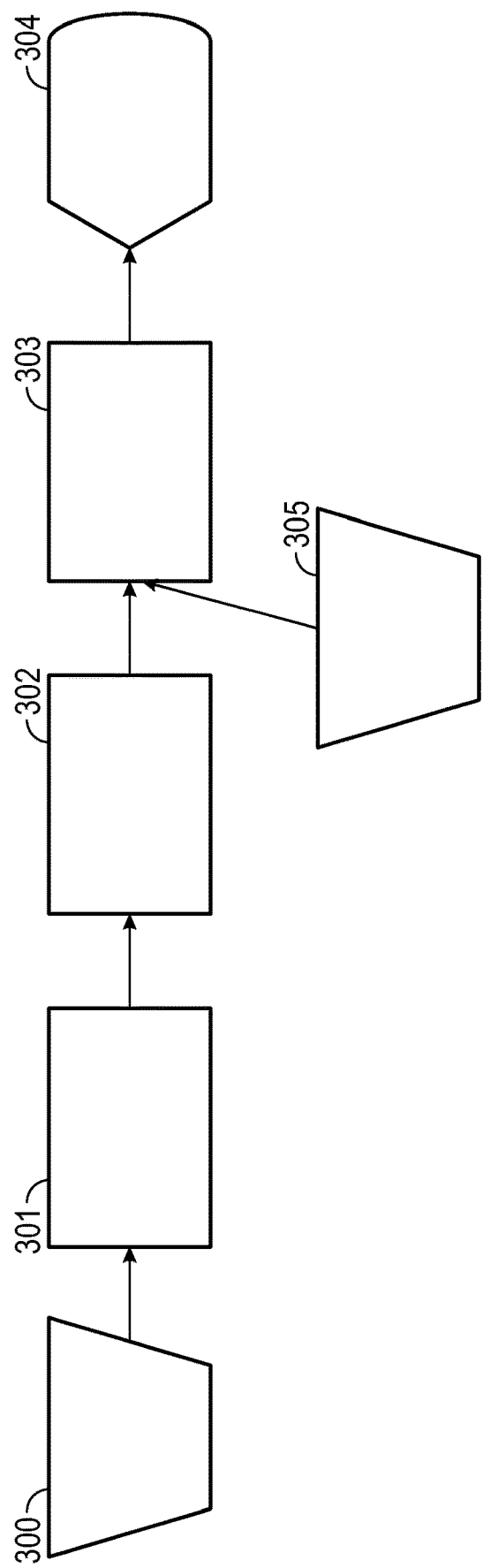
FIG. 3 is a schematic flow diagram illustrating the operation of a page elements menu module in accordance with various embodiments.

FIG. 3 is a schematic flow diagram illustrating the operation of a page elements menu module 300 according to the present invention. In particular, the page items menu module 300 may be configured to parse the DOM 301 to identify elements which are focusable or are of a certain type (e.g., <p>), while filtering out elements that are unable to be spoken. The full element list may be passed to an element classifier 302 which classifies the elements based on the user actions that can be performed on them (e.g., elements which can be clicked on and followed such as a link, elements which can be filled in such as a form field, text which can be read aloud, and the like). Markup is then generated 303 and passed on for display 304.

With continued reference to FIG. 3, the markup 303 visually differentiates between content that is currently visible within the viewport, and content that requires scrolling to reveal. In view of the foregoing distinction between visible and non-visible items, changes to the viewport preferably initiate the markup generation process 303 to update the Page Items Menu to reflect the currently visible elements 305.

When using the Page Elements Menu without engaging the audio player, when an element is selected the AE JavaScript dynamically inserts a tabindex element attribute to anchor the page at the selected object (footer, top of page, link, etc.). When the user thereafter focuses away from the selected element, the AE JavaScript dynamically extracts the tabindex ("anchor"). In this way, referred to herein as ad hoc page navigation, traditionally non-navigable items become navigable as a result of the insertion of temporary tags (when the Page Elements Menu is enabled) and subsequent deletion of the temporary tags when the Page Elements Menu is disabled. The tags may be inserted/extracted individually when each page element is selected using the Page Elements Menu; alternatively, the tags may be inserted/extracted or en masse when the Page Elements Menu is engaged/disengaged.

Figure 4:
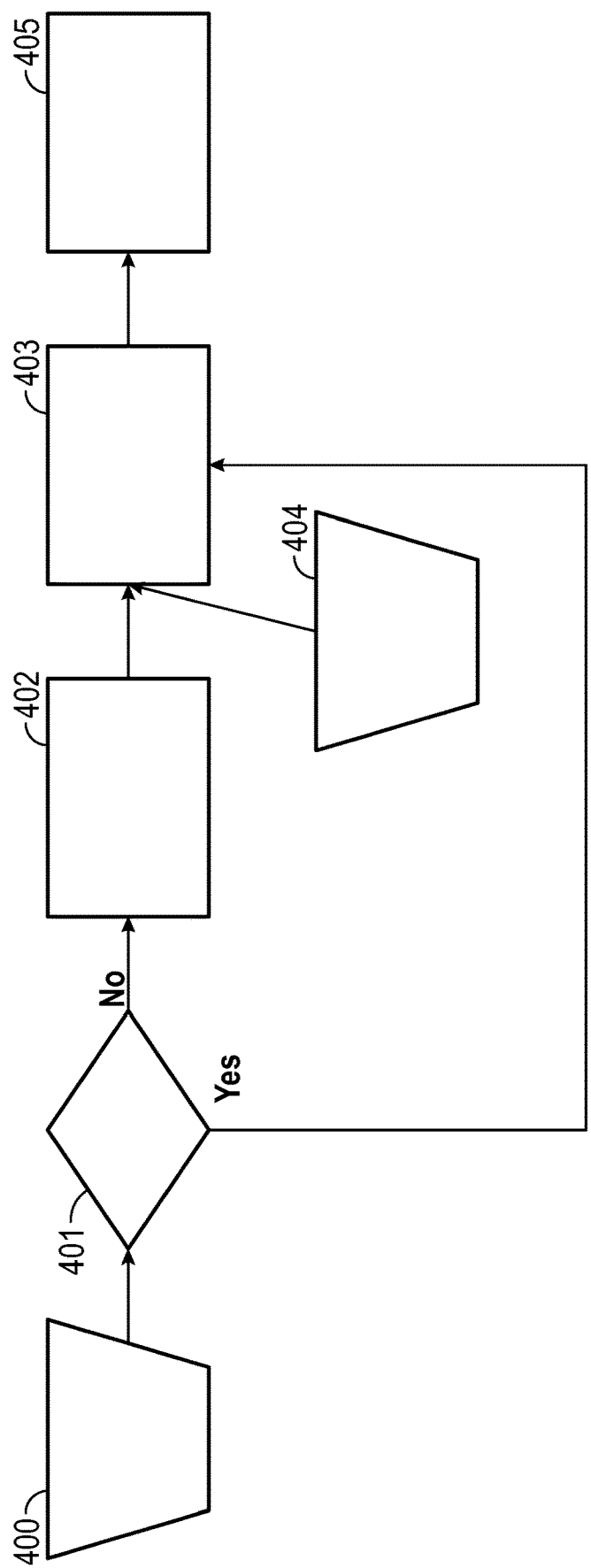
FIG. 4 is a schematic flow diagram illustrating an exemplary process for inserting and deleting tab indices in accordance with various embodiments.

FIG. 4 is a schematic flow diagram illustrating an exemplary process of inserting and deleting tab indices. In particular, a user may select an item from a Page Elements Menu 400. The system inspects 401 the menu's target associated with the selection to determine if the user could use the tab key to advance through the content and land on their selection. If the selected item cannot be navigated to using the tab key, a process 402 injects some form of a tabbable markup (e.g., HREF/anchor/tabindex) into the selected item. A process 403 then sets the browser focus to the selected element. Once the user moves from or de-selects 404 the item, a subsequent process 405 removes any injected markup; otherwise, no changes to the DOM are made.

Various remediation techniques such as improving the DOM through attribute (e.g., alt text) tagging will now be described.

Figure 5:
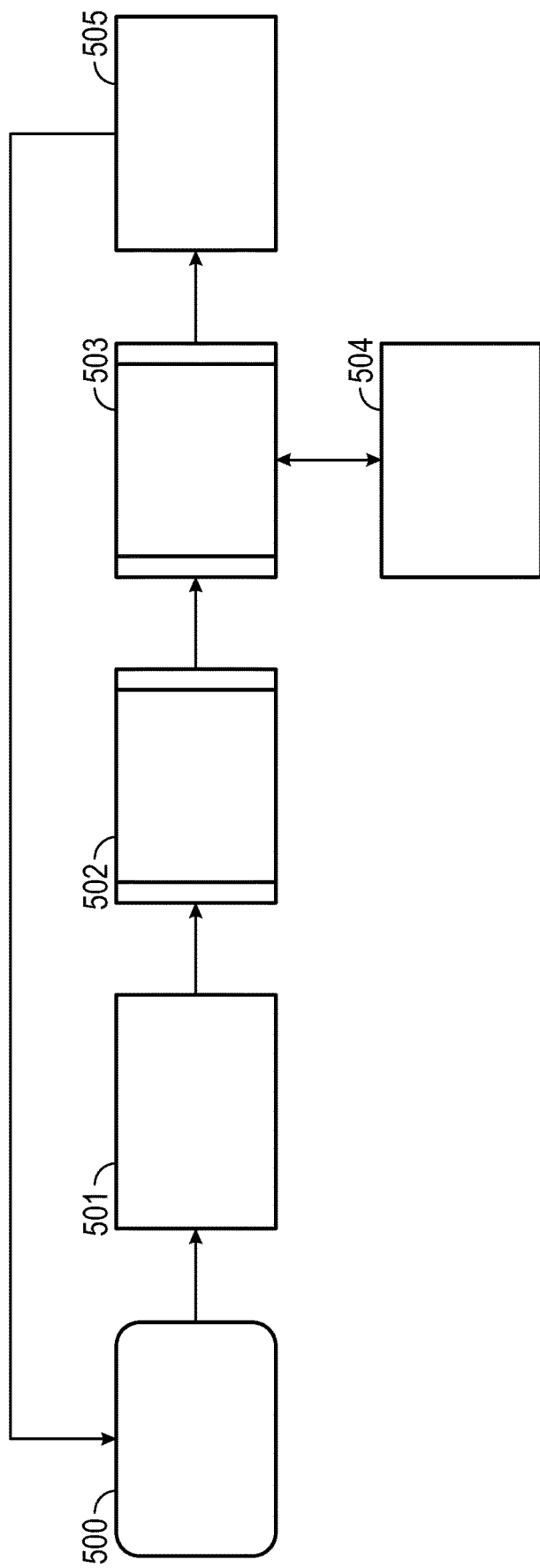
FIG. 5 is a schematic flow diagram illustrating an exemplary remediation delivery process in accordance with various embodiments.

FIG. 5 is a schematic flow diagram illustrating an exemplary remediation delivery process. In particular, once the AE JavaScript loads 500, manual remediations present in the configuration are applied and executed 501. A process 502 then runs to scan the page to detect compliance issues. Using a heuristics engine 503, detected compliance issues are mapped to pre-existing remediation scripts 504. A process 505 then programmatically executes/applies each matched remediation. Data returned from this process may include issues that existed prior to remediation, issues resolved through individual scripts, and the level of confidence that each remediation was successful in resolving the compliance issue.

Figure 7:
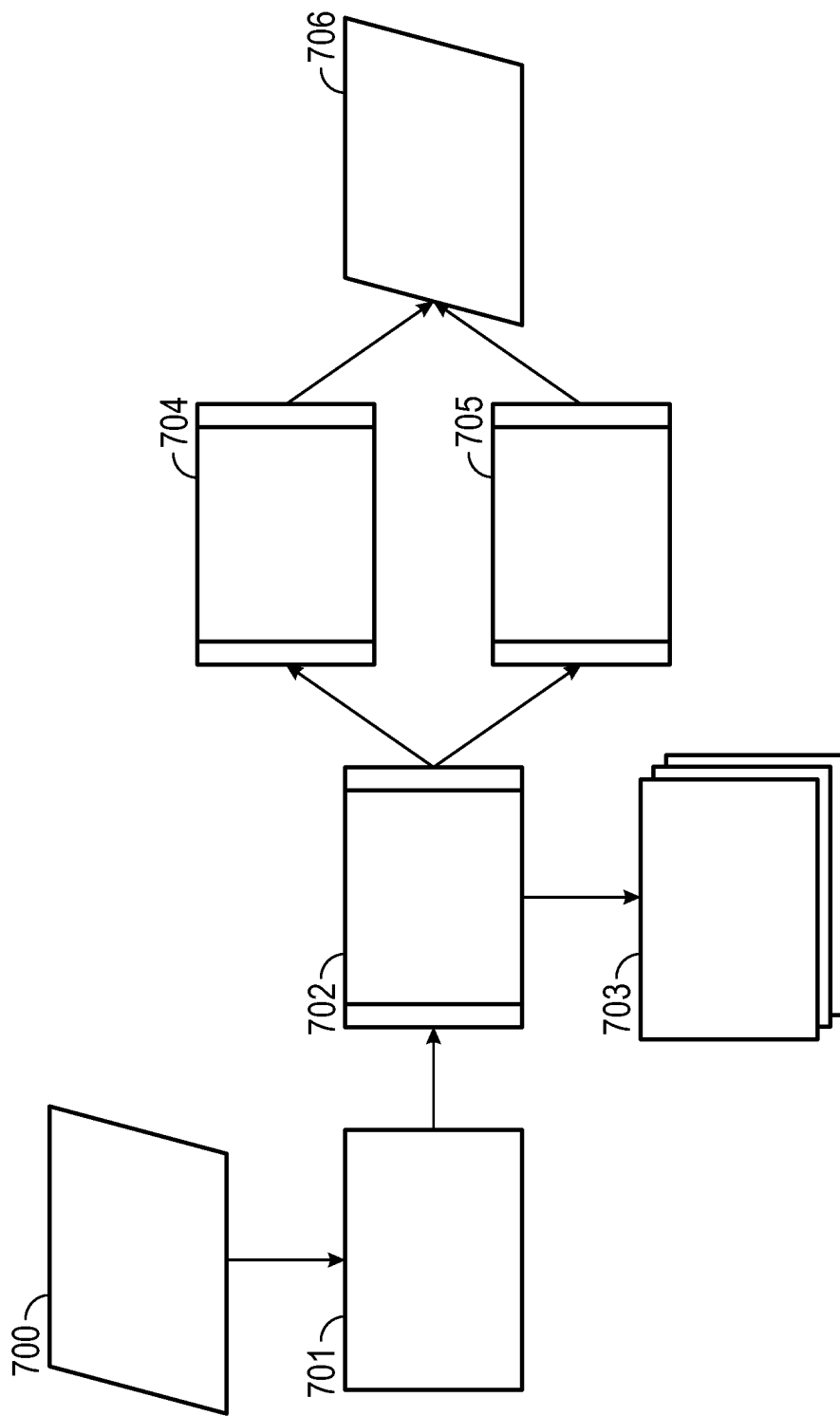
FIG. 7 is a schematic flow diagram illustrating an exemplary smart image description process in accordance with various embodiments.

With reference to FIG. 7, for images lacking an adequate alt text the system may be configured to programmatically send the image to an image recognition server to determine the nature of the image and insert a best fit alt text. By way of non-limiting example, the system may be configured to dynamically insert the phrase "president Obama" or "George Clooney" based on information returned from the image recognition server, in lieu of the missing or default alt text (e.g., "image"). The dynamically inserted text can then be spoken to the user, either using a native screen reader or the AE Player.

FIG. 7 is a schematic flow diagram illustrating an exemplary smart image description process. In particular, an image 700 is passed to a smart image description system 701. A process 702 then sends the image one or more internal and/or external image recognition systems 703, to obtain one or more interpretations of the image. Image descriptions may then be returned either through a heuristics engine 704 or a natural language engine 705 to generate a human readable, preferably grammatically correct version of the image description, which is then returned 706 to the calling process.

Figure 6:
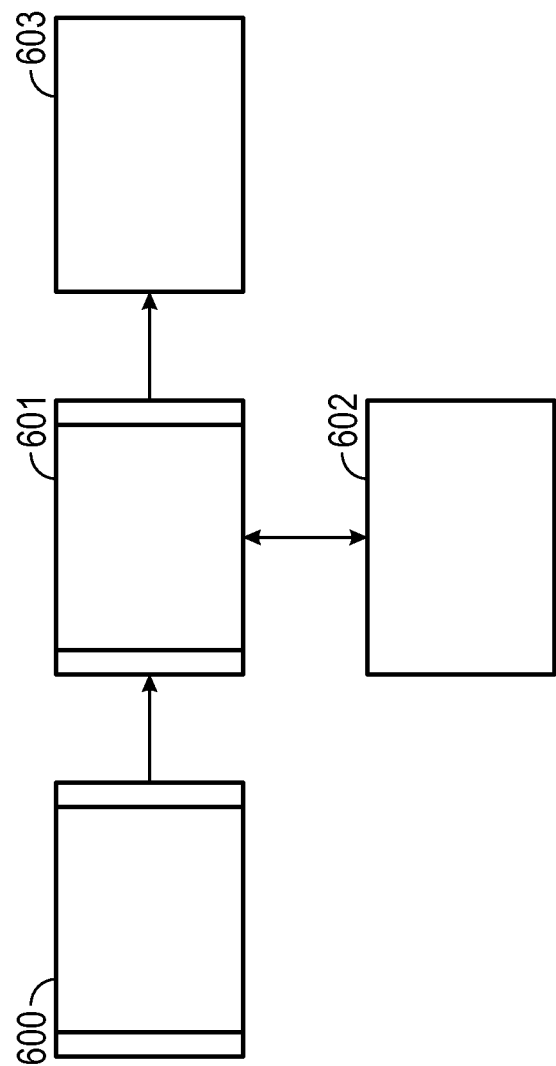
FIG. 6 is a schematic flow diagram illustrating an exemplary smart text lookup process in accordance with various embodiments.

Referring now to FIG. 6, another auto-remediation feature of the present invention involves Smart Text Replacement. By way of non-limiting example, CNN, Fox News, Bank of America, and other sites often share similar "Like us on Facebook" and "Follow us on Twitter" elements, which may include tracking pixels to count clicks. As a screen reader user encounters these elements, processing them can be cumbersome if they are not labeled and tagged properly. The AE JavaScript may be configured to identify common file paths with hyperlinks (e.g. a hyperlink to a Facebook "like us" landing page), and programmatically assign best practice descriptive alt text to the element based on the file path/hyperlink. In this way, when a screen reader or the AE player encounters the element, it is properly and consistently vocalized as "like us on Facebook" even if the element is not coded that way.

FIG. 6 is a schematic flow diagram illustrating an exemplary smart text lookup process 600. In particular, the process 600 may be configured to search the DOM for commonly occurring elements (e.g., Facebook Like Us, advertisements, App Store links) that do not have text descriptions or have ambiguous text descriptions. An element classification process 601 suitably employs a heuristic engine 602 to identify relevant attributes (e.g., HREF) to empower process 603 to apply text description tags to the un-tagged or improperly tagged element.

The foregoing techniques may be extended to facilitate the programmatic generation of audio description of a video file, for example using artificial intelligence (AI). In one embodiment, a video may be sent to a server which samples the frames and identifies respective images, and using AI techniques returns text which describes the subject matter of the video file based on similarities and/or differences between/among respective (e.g., successive) frames. The text which is generated is analogous to subtitles displayed during a sporting event. Note that the AI derived description of the video is different from, and can be superimposed onto (or in synchronized conjunction with), the audio track which may accompany the video in the ordinary course.

Figure 8:
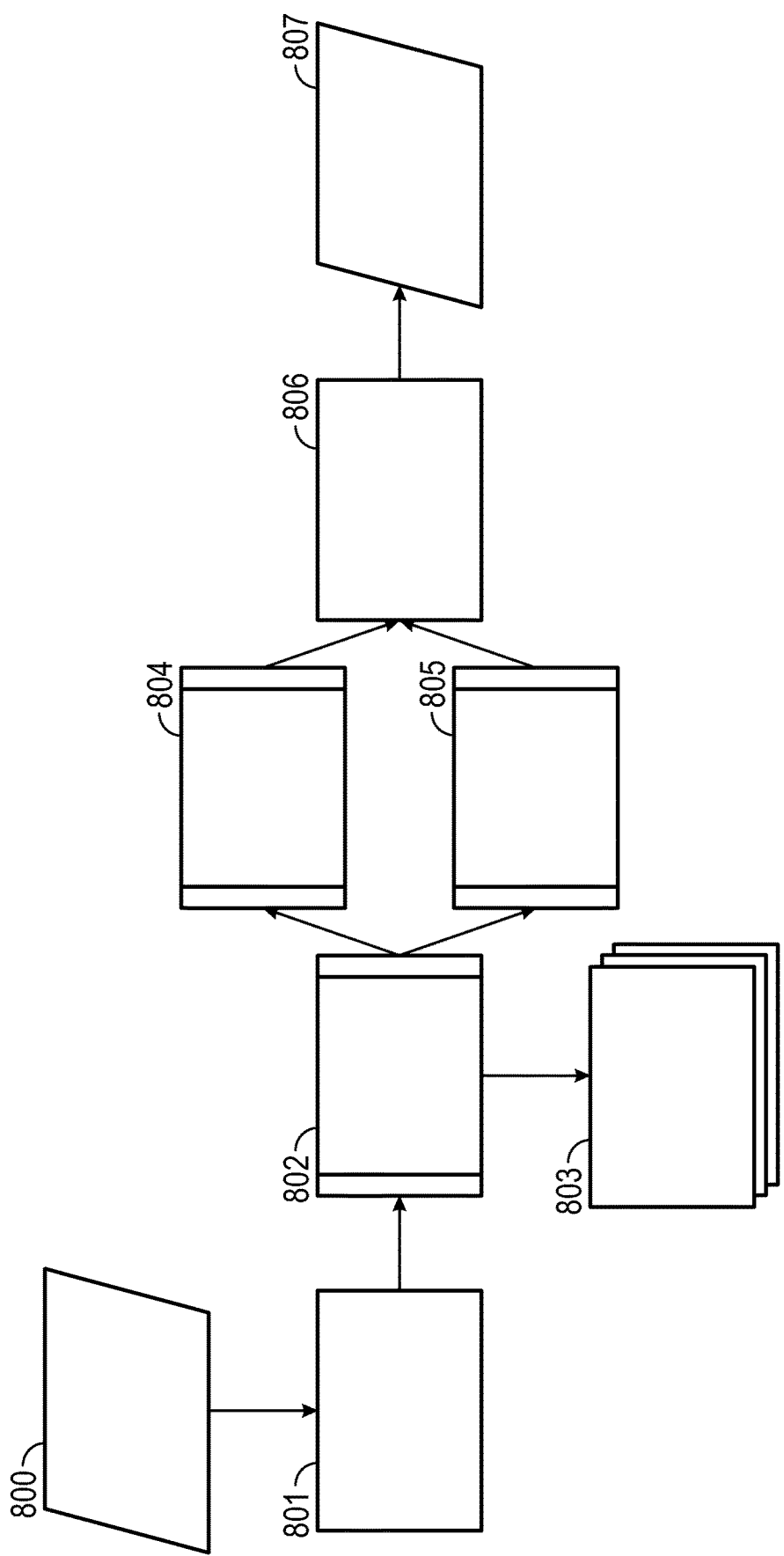
FIG. 8 is a schematic flow diagram illustrating an exemplary smart video description process in accordance with various embodiments.

FIG. 8 is a schematic flow diagram illustrating an exemplary smart audio description process. In particular, the calling process provides a video 800 to the smart audio description module 801. Each video frame (or a sampling thereof) is passed to a process 802 which sends the images to one or more internal and/or external image recognition systems 803, to thereby obtain a single or multiple interpretations of each image. Sequential differences 806 between successive images may be used to infer the subject matter of the video, and thus a high level description of the video. A heuristic engine 804 or natural language engine 805 generates a TTS convertible text description which is returned 807 to the calling process, along with metadata such as per frame time stamps for use in synchronizing the description with the video track.

Yet a further feature of the present invention involves auto-remediation of manually fillable form fields. By way of non-limiting example, in order for a screen reader (or the AE player) to determine that the form is requesting the user to enter the user's first name, the developer must code the form label (analogous to a picture's alt text) to indicate that the user is being prompted to enter his or her first name. If the field is not properly labeled, confusion may ensue.

In accordance with an embodiment, the AE JavaScript may be configured to programmatically inspect nearby text elements and infer and inject an appropriate label based on contextual cues such as the words "name," "first," and "last" as well as relative positions and types of attributes, i.e., a SPAN tag in front of an INPUT field.

As discussed above, the AE JavaScript may be used to refine the description of an image using a developer portal, whereupon the new alt text is saved and injected into the DOM via AE JavaScript when the page renders. In accordance with a further aspect of the invention, the system may be configured to periodically ping the page containing the remediated alt text to determine if the image is still there and, if not, extract or modify the remediation accordingly. If the image changes, the system may be configured to trigger a prompt to reevaluate the alt text for the new image, and either change or suppress the previously remediated text. The foregoing technique may be extended beyond images to periodically assess the validity of any remediation over time.

In an embodiment, a developer portal implements a live remediator function which is maintained at a different server from the website being remediated. The developer portal allows the page being assessed to be launched and displayed within an iFrame available from the developer portal or, alternatively, within a separate browser tab or window outside of the developer portal. Generally analogous to the industry standard web accessibility evaluation (WAVE) tool available at http://wave.webaim.org, the developer portal of the present invention embodies a browser plug-in for assessing WCAG-type compliance of web pages, and displays issues detected during the evaluation phase discussed above.

In an alternative embodiment, the developer portal allows the developer to write the markup while simultaneously viewing the rendered remediated page in real time thru an iFrame from the same developer portal, without having to separately access the underlying website outside of the developer portal.

As discussed above, once the AE audio player is engaged, the AE JavaScript sends blocks of text from the underlying website server to a text-to-speech (TTS) module at a remote AE server, which returns an audio file to the website server or directly to the end user device in real-time (or near real-time). In this context, the audio player may comprise AE JavaScript code which instructs the native audio driver on the device to stream audio to the user. The logic for determining keyboard focus and, hence, to determine where to start the TTS, resides in the AE JavaScript.

In one embodiment, the AE JavaScript may be configured to send a predetermined block of words (e.g., 500 words) at a time or one paragraph, whichever is smaller. The system sends the next paragraph when the audio player is nearly finished speaking the current paragraph. In addition, the system only sends text blocks (e.g., paragraphs) for TTS conversion which are proximate the cursor focus, as opposed to the entire page. This is in contrast to prior art systems which typically send the whole page when the screen reader is engaged.

Figure 9:
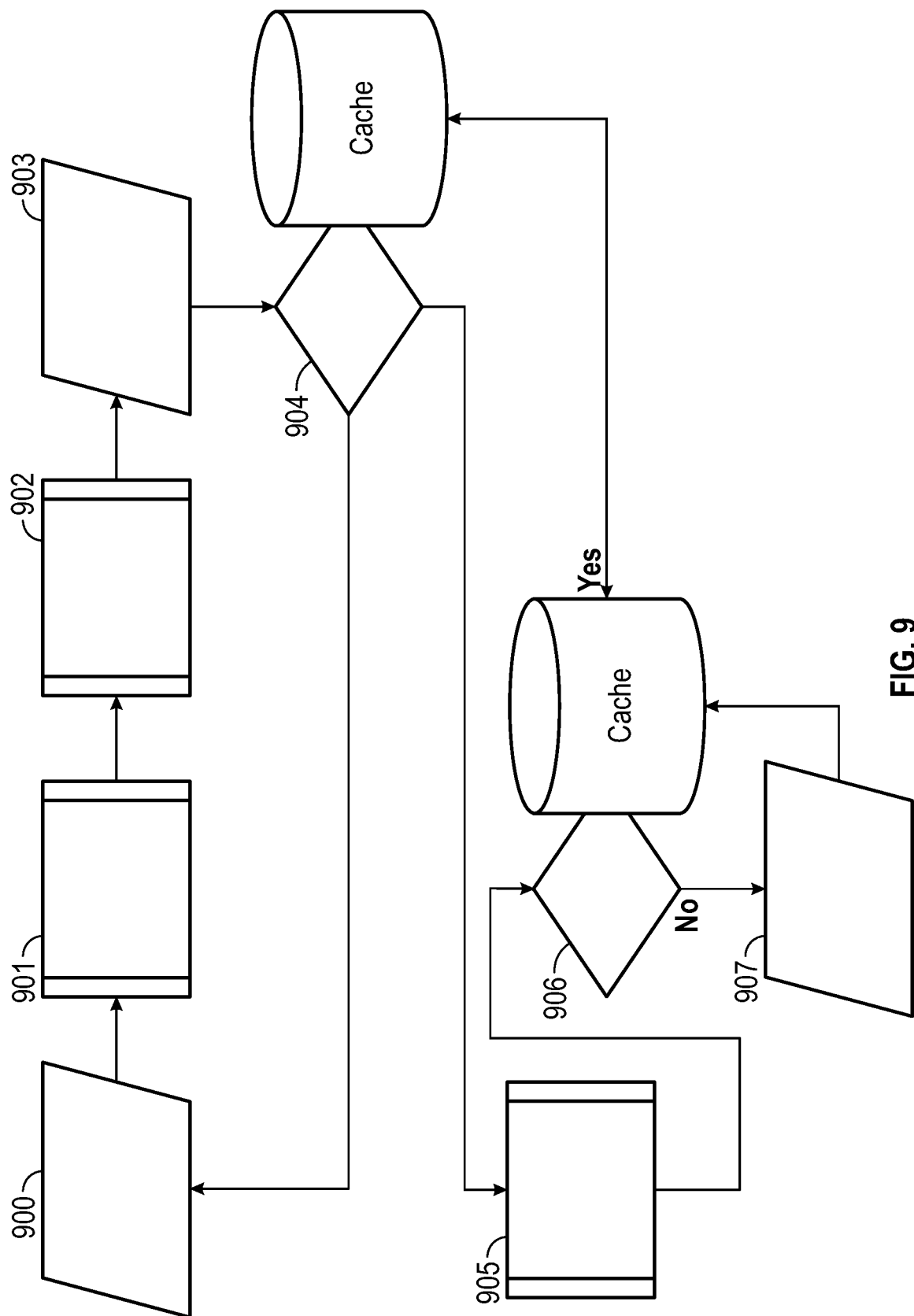
FIG. 9 is a schematic flow diagram illustrating the operation of an exemplary TTS process with multi-layer caching in accordance with various embodiments.

FIG. 9 is a schematic flow diagram illustrating the operation of an exemplary TTS process with multi-layer caching. In particular, TTS requests 900 may originate from the audio player embedded in the AE JavaScript or from another calling function. Each TTS request first passes through a text normalization process 901 which removes white space and other noise. A hash may then be generated 902 based on the submitted text, language tag, and desired voice font. The normalized request may optionally be sent to a content delivery network (CDN) 903 that first checks a CDN cache 904; if not found, the request is sent to an asset server 905. The asset server performs its own cache check 906; if not found, a new audio file is requested from the TTS process/API/provider 907.

With continued reference to FIG. 9, those skilled in the art will appreciate that prior art CDN cache systems typically rely on full URL matches, so that if a user visits site1.com and makes a TTS request for the string "Hello," and thereafter makes the same request at site2.com, prior art CDN systems will create and hold two copies of the same TTS conversion audio file. In contrast, the present asset cache 906 only needs to maintain one copy, inasmuch as it is based on, for example, the requested text block and voice font (and not the full URL). In this way, only a single request needs to be made to the TTS process for the same text, even across multiple domains.

Presently known voice applications include Apple's Siri™, Nuance's Dragon™, Windows' Cortana™, and Amazon's Alexa™ which simply drive a user to a web page in response to a voice request; that is, they convert speech to text, apply the text to a database or look-up table, and return a web page or search results for display and loading. The present system, on the other hand, operates inside the web page and interacts with the objects and elements in the page via the DOM to fill out forms, apply for a job, purchase products, and otherwise navigate within and interact with the website, kiosk, or non-web based environment. Moreover, as described in greater detail below, stacking the AEVoice function onto the AE audio player facilitates apparent bi-synchronous oral navigation and execution.

Figure 10:
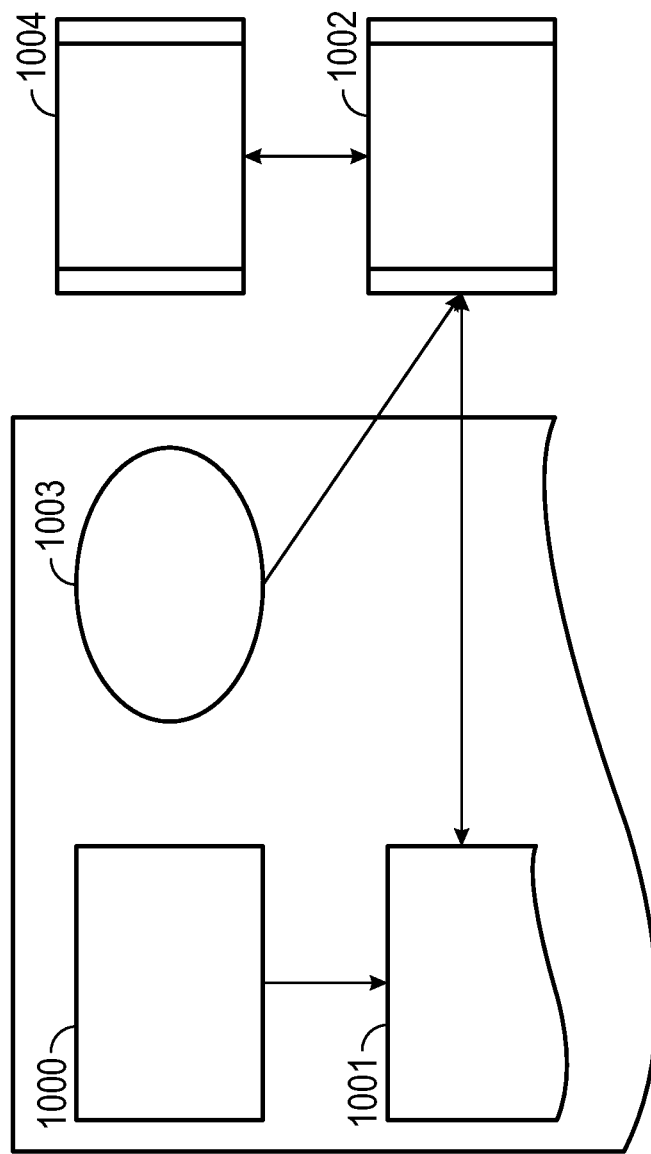
FIG. 10 is a schematic flow diagram illustrating the operation of an exemplary voice module (e.g., AEVoice) in accordance with various embodiments.

FIG. 10 is a schematic flow diagram illustrating the operation of an exemplary voice module, sometimes referred to herein as AEVoice, in accordance with the present invention. In particular, the AEVoice module 1000 may be embedded in the AE JavaScript at the website server. The AE JavaScript may be configured to load an iFrame 1001 which links the page to a secure AE URL at a remote server. This iFrame 1001 may be configured to open a WebSocket connection to an AEVoice server 1002. When active, voice data captured via the user's microphone 1003 is streamed to the AEVoice module 1002 via the WebSocket connection in blocks or chunks.

In one embodiment, voice data may be captured by automatic speech recognition (ASR) software native to the device and supported through the browser application in use, in which case, text is generated locally (from the user's device), thus bypassing the AEVoice WebSocket listener connection and allowing the user to interact with the elements of the web page (DOM) without relying on an ASR API connection with AudioEye.

Once silence is detected or other suitable metrics indicate the end of a voice chunk by the iFrame 1001, a complete audio file built from the streamed audio is sent to a speech-to-text or ASR API 1004. Text returned from the API 1004 is passed back to the iFrame 1001 for further processing and analysis. The iFrame code may present the user with their spoken text, perform actions or execute processes based on the voice command, or the like.

In accordance with a further aspect of the present invention, the AEVoice module and the AE audio player functions may be configured to allow users to engage bi-directionally with websites, speaking commands while listening to web content.

In one embodiment, users can manipulate a visual icon or keyboard shortcut to engage the AEVoice module and its listening capabilities. If the AE audio player is playing content when the user engages the microphone, the audio content may be paused. Normal AEVoice flow proceeds, with audio streamed to the AEVoice service and text returned only after the user stops speaking (or the icon/keyboard shortcut is pressed a second time). If a command is detected, it will be executed; if not, playback of the page content may resume.

In another embodiment, rather than engaging the visual icon or keyboard short cut as described above, the user may engage the voice function by pressing and holding the icon or shortcut, much like using a Push-to-Talk device.

In yet another alternative mode intended for users with headsets, the AEVoice software may be configured to always listen, regardless of whether the audio player is outputting audio. The AEVoice system may then make calibration decisions based on detected audio levels, to thereby ascertain when the user is speaking and only sending speech to the AEVoice module when it is determined that the user is speaking.

In accordance with a further aspect of the invention, the AE audio player may render seamless language transitions based on language tags encountered during web page or other document navigation. For example, when the AE player reading content aloud in English encounters a block of text accompanied by a different language tag (e.g., Spanish), the player may be configured to dynamically and programmatically read the tagged element in the appropriate language (Spanish in this example), and also employ a corresponding Spanish voice font. That is, the AE JavaScript sends the text block to the TTS engine (at a remote server) along with the language tag, and returns an audio file in the appropriate language and voice font. This concept may be extended so that contextual Help is also spoken based on the then current language tag.

In this regard, those skilled in the art will appreciate that a voice font is a computer-generated voice that can be controlled by specifying parameters such as speed, pitch, and inflexion and made to pronounce text input. The concept is analogous to a text font in that the same input may be represented in several different ways based on the design of each font.

Figure 11:
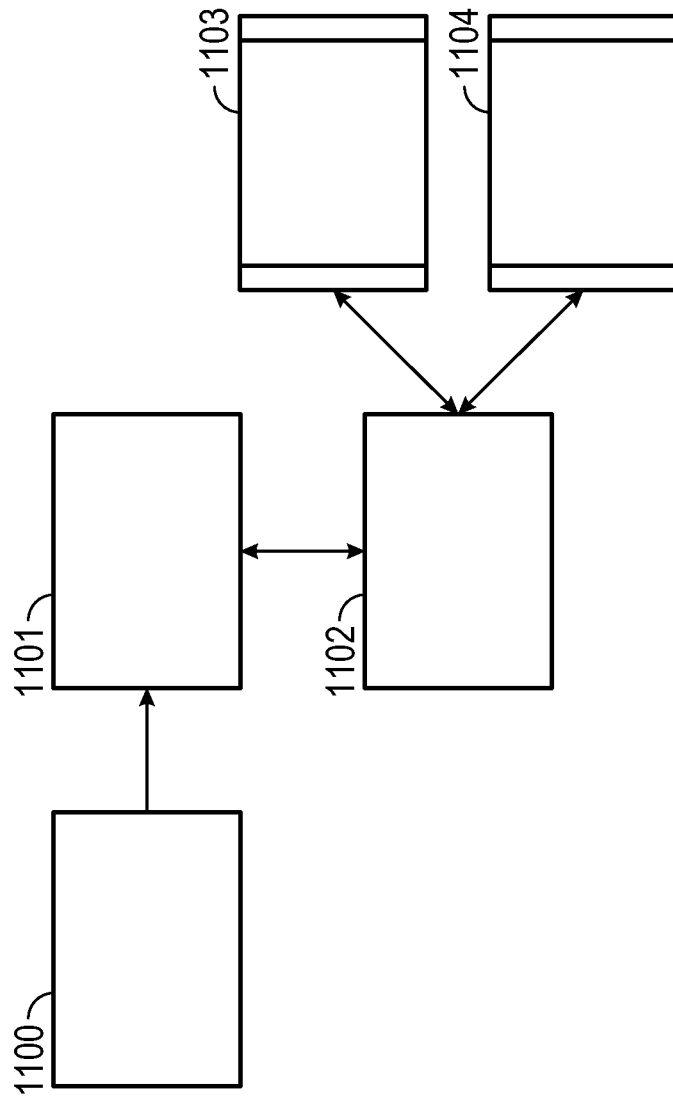
FIG. 11 is a schematic flow diagram illustrating the operation of an exemplary language translation module employing selective voice font in accordance with various embodiments.

FIG. 11 is a schematic flow diagram illustrating the operation of an exemplary language translation module employing selective voice font. In particular, requests made from the AE audio player module 1100 to a CDN 1101 or assets system 1102 may include a language attribute. When present, the assets system 1102 may be configured to utilize an API 1103 to identify the source text language and, if the source and destination languages are different, utilize an API 1104 to translate from one language to another. The assets system 1102 may then select an appropriate voice font icon the destination language and in the appropriate gender (e.g., the user's gender) and return back translated audio.

In accordance with a further aspect of the present invention, the AE JavaScript may be configured to allow full navigation through the web page hierarchy using only voice commands.

In this regard, presently known systems for using voice to control a computer are limited, and are not well suited for website and menu navigation. For example, Amazon's Echo™ is a hands free, voice controlled speaker which can connect to Alexa™ voice, the brains behind Echo. However, Echo has no keyboard, and no screen, making it difficult if not impossible for use with web page navigation. Although a user could potentially configure presently known voice command systems to order products, those systems do not lend themselves to interacting with a web page in real time to do so. In contrast, the AE JavaScript allows interaction using only the native capabilities of the browser, and using the inherent navigation of the existing web page content as it is currently laid out in the DOM. In this sense, any website configured with the AE JavaScript may be fully controlled and accessed in conjunction with common supported and native ASR software applications such as Siri on iOS.

By way of further illustration, presently known voice command systems can interact with a native application (such as the Direct TV application) to control the application (for example, changing the channel) in response to a voice command. In contrast, the present invention facilitates interacting with content in an existing web page hierarchy using only voice commands.

Specifically, when a web page enabled with AE JavaScript expects the user to enter text, the AE JavaScript injects code allowing voice to text conversion, so that when the user speaks, the speech is converted to text in real-time and the corresponding text inserted into the text box or form field on the web page.

Those skilled in the art will appreciate that voice detection is typically a native browser function which must be enabled in the browser. By way of example, when a user visits a first website and enables voice, the AE JavaScript may be configured to drop a cookie into the browser using an invisible iFrame, so that when the user switches domains to another AE enabled which also has an invisible iframe, the browser is able to detect the presence of a prior authorization for the iFrame and re-enable voice controls for the current domain, with the result that the voice function remains seamlessly enabled across domains without any user action needed. This is because the AE JavaScript looks thru the iframe to find the "permission to use voice" which is embedded in the browser cookie. More generally, browser preferences (e.g., contrast, font size, magnification, reader visualization function enabled) may, thus, be persisted across AE JavaScript enabled domains by dropping cookies in this manner. As a result, each time a user starts an AE experience, the user may do so using the previous preferences.

In accordance with a further aspect of the present invention, processing efficiencies may be obtained by concatenating a plurality of audio bites into a single audio file, referred to herein as an audio sprite. By analogy, an image sprite is a collection of several images displayed from a single graphics file (e.g., jpeg), using CSS to define which sub-images appear in which regions of the 2 dimensional space in which the jpeg is rendered. The analogous audio sprite is a small TTS file (e.g., an alphabet/numeric/common name-.WAV file), sent from the AE server to the local machine to perform local TTS on text entered by the user into a field such as a form field, search box, or whenever entered text is read back to the user character-by-character. The audio sprite may employ CSS to define which numbers or letters are spoken at particular timed intervals as the audio is rendered (spoken).

The foregoing aspects of the present invention may be extended to contemplate a secondary device configured to control the primary device on which the website, menu, or other user interface is rendered. With regard to voice commands, the speech to text conversion may occur at the website server, at a remote server, within the primary device while leveraging local ASR resources that may or may not rely on their own remote resources, or on a secondary device such as a mobile device, personal digital assistant, or wearable device (e.g., Fitbit, jawbone, watch, key fob, lanyard, or the like). Device pairing may be accomplished in any desired manner, such as any of the techniques discussed in U.S. Pat. No. 8,903,978 B2 entitled "Method and Apparatus for Pairing a Mobile Device to an Output Device" issued Dec. 2, 2014, the entire contents of which are hereby incorporated herein by this reference.

The secondary device can be configured to control a primary device (e.g., website, airport kiosk, drive up menu, hotel room remote control) which is enabled for voice commands as described above, but which may not have a microphone that is convenient for the user (or none at all). Moreover, many individuals prefer not to touch the primary screen, but are comfortable swiping and otherwise interacting with their own personal (secondary) device screen to control the primary screen.

By way of non-limiting example, presently known soda dispensing machines and other menu driven interfaces allow users to pair a secondary personal device to the soda machine, and thereby control the operation of the machine using the personal device. In an embodiment, this paradigm may be extended to allow the user to enter voice commands into the personal (secondary) device, and thereby control the primary device (e.g., soda machine, drive up or walk up menu or kiosk) using voice commands, touch screen interaction, gestures, and the like.

FIG. 13 is a schematic block diagram and flow sequence diagram illustrating the use of a secondary device to control a primary device according to various embodiments.

More particularly, the system includes a secondary device 1302 (e.g., a mobile telephone or wearable device) suitably equipped with input/output (IO) capability such as a microphone 1301, a touch screen 1305, a haptic module 1305, and/or a speaker 1307. The system further includes a primary device 1304 such as a product dispensing machine, menu, information kiosk, computer, help desk, or the like, a primary device server 1310 configured to host the interface on the primary device which is suitably enhanced within an integrated AE JavaScript code base, and a second server 1312 configured to host various processes and services accessible by the first server including RADAE and/or TTS services.

In an embodiment, the secondary device requests pairing with the primary device (Task 1230), which confirms the paired arrangement (Task 1322). The user may then interact with the primary device, for example by requesting content (e.g., TTS) (Task 1324), whereupon the primary device passes the request to the primary server (Task 1326), which may be co-located with the primary device. The primary server then accesses an accelerator at the AE server (Task 1328). The AE server 1312 then returns the remediated content to the secondary device (Task 1330), either directly or via the primary device and/or the primary server.

With continued reference to FIG. 13, the user requests an object (Task 1332) such as a menu item, a form field, or the like, whereupon the primary server selects and returns the object to the secondary device (Task 1334). The user may request that voice commands be enabled (Task 1336), whereupon the AE server acknowledges that voice is enabled (Task 1338). The user speaks a voice command into the secondary device (Task 1440) triggering a speech-to-text conversion which may be processed at the secondary device, the primary device, or the AE server, and a converted text file returned to the primary and/or secondary device (Task 1342). The system then processes the voice command as text (Task 1344), and responds to the command (Task 1346) by taking the requested action (e.g., executing the voice command).

More generally, the principals and techniques discussed herein may be employed to allow an individual with a disability to effectively reach outside his or her personal circle, using a personal (secondary) device to control or otherwise interact with kiosks, menus, websites, remote controllers, televisions, vehicles, and virtually any other system employing assistive technologies.

By way of non-limiting example, presently known fast food, product, ticket, and cash (ATM) dispensing, and information kiosks are not well equipped to accommodate visually impaired, low vision, wheel chair bound, or other users who are unable, unwilling, or who simply choose not to interact directly with the primary device (a menu kiosk in this example). By stacking or otherwise integrating some form of the AE JavaScript on the operating system, server, or other control module associated with the primary device, and by pairing or linking the primary and secondary devices together, the user may interact with the kiosk using the personal device.

In particular, the AE JavaScript may be configured to enable the primary device to speak menu choices aloud to the user, whereupon the user may navigate or otherwise interact with the primary device by speaking into or swiping/touching a touch screen on the secondary device. In a menu context, for example, the user may be instructed to tap (or speak) the top left quadrant of the screen to select sandwiches, the top right for fries, the bottom left for drinks, the bottom right for more options, and double tap anywhere to exit or return to the previous navigational level. By interacting with the secondary device in a way which mimics the primary device, the assistive technologies embodied in the secondary device may be manifested in the secondary device, effectively extending the reach of individuals with disabilities to all device platforms.

A method is thus provided for persisting a user preference associated with an assistive technology across multiple web domains. The method includes: installing remediation code on a first server hosting a first website and on a second server hosting a second website; establishing, using a browser operating on a user device, a first session with the first website; enabling an assistive technology during the first session; defining a user preference associated with the assistive technology during the first session; placing, by the remediation code, a cookie into the browser indicating the first user preference; establishing, using the browser operating on the user device, a second session with the second website; and using the cookie to persist the user preference to the second session.

In an embodiment, placing the cookie into the browser comprises passing the cookie through an iframe, where the iframe may comprise an invisible iframe.

In an embodiment, persisting the user preference to the second session is controlled by the remediation code without any additional user action.

In an embodiment, the remediation code comprises JavaScript.

In an embodiment, the first server is remote from the second server.

In an embodiment, the assistive technology comprises one of: an audio player function; a screen reader tool suite; a voice command feature; and a page elements menu.

In an embodiment, the screen reader tool suite comprises font, magnification, and contrast controls.

In an embodiment, the user preference comprises maintaining the assistive technology in the enabled state.

In an embodiment, the method further includes embedding indicia of the user preference in the browser cookie.

Computer code stored in a non-transient medium is also provided for performing, when executed by a computer processor, the steps of: superimposing a timed toggle of a branding icon over a universal accessibility icon on a web page; and revealing, in response to a user command, an assistive technology tool bar including controls for independently enabling at least an audio player and a screen reader tool suite.

In an embodiment, the user command comprises one of hovering over and clicking on the branding icon.

In an embodiment, independently enabling comprises selecting one of: a first option to enable the audio player without enabling the screen reader tool suite; a second option to enable the screen reader tool suite without enabling the audio player; and a third option to simultaneously enable both the audio player and the screen reader tool suite.

In an embodiment, superimposing the timed toggle comprises using one of a cascading style sheet (CSS) and JavaScript to periodically animate the branding icon.

In an embodiment, the assistive technology tool bar further includes a control for independently enabling a help desk function.

In an embodiment, wherein the computer code comprises JavaScript.

A method of ad hoc page navigation through a website using a browser is also provided. The method includes: displaying a page element menu comprising a plurality of objects; in response to the selection of one of the objects by a user, dynamically inserting an anchor into the object; displaying the page corresponding to the selected object; and in response to the user focusing away from the selected object, dynamically extracting the anchor from the object.

In an embodiment, the anchor comprises a tabindex element attribute.

In an embodiment, the plurality of objects comprises at least two of: page heading; hyperlink; image; footer; and top of page.

In an embodiment, displaying the page comprises setting the browser focus to the selected object.

A method is also provided for programmatically assigning descriptive alt text to an element on web page having an associated document object model (DOM). The method includes: inspecting the DOM for an improperly tagged element having an associated hyperlink; determining the file path associated with the hyperlink; and assigning an alt text description to the improperly tagged element based on the file path.

In an embodiment, the improperly tagged element comprises a user prompt to "Like Us on Facebook," and the file path comprises a link to a Facebook Like Us landing page.

In an embodiment, the improperly tagged element comprises a user prompt to "Follow Us on Twitter," and the file path comprises a link to a Twitter Follow Us landing page.

A method is also provided for programmatically assigning descriptive alt text to an image on web page, the web page having an associated document object model (DOM). The method includes: inspecting the DOM for an image lacking an adequate alt text; sending the image to a remote image recognition server to determine the nature of the image; assigning an alt text description to the image based on the determined image nature; and speaking the alt text description to a user using an assistive technology.

In an embodiment, the assistive technology comprises one of a native screen reader and an audio player embedded in JavaScript remediation code.

In an embodiment, the image recognition server comprises an image database and a recognition module for comparing the image to the contents of the image database.

In an embodiment, the nature of the image comprises one of: a landmark; a location; the name of an object; and the name of a person.

A method is also provided for programmatically generating an audio description of a video file appearing on web page enhanced with remediation code which includes an embedded audio player. The method includes: sending the video file to a remote image recognition server; sampling respective frames of the video file and identifying corresponding respective images; using artificial intelligence (AI) techniques to determine the subject matter of the video file based on differences between successive frames; returning a text-to-speech (TTS) convertible text file which describes the subject matter of the video; and speaking the text file to a user using the embedded audio player.

In an embodiment, the text file comprises metadata for use in synchronizing the text file with the video file.

In an embodiment, the metadata comprises respective timing data associated with each of a plurality of the respective frames.

A method is also provided for enhancing a web page hosted by a first server to render the page navigable by low vision users through voice commands. The method includes: in response to the keyboard selection of a text element by a user, the text element being of the type which prompts the user to enter an answer into a field on the web page, generating a text-to-speech (TTS) file corresponding to the text element; processing the TTS file to thereby audibilize the text element to the user; capturing a recording of the user speaking the answer; sending the recording to a second server; generating a speech-to-text (STT) file of the recording at the second server; and processing the SIT file at the first server to thereby enter the answer into the field.

In an embodiment, the method further includes establishing a WebSocket connection between the first and second servers.

In an embodiment, the method further includes suspending audibilizing the text element to the user while the user is speaking the answer.

In an embodiment, the method further includes resuming audibilizing the text element to the user when the user is finished speaking the answer.

In an embodiment, the answer comprises a voice command.

In an embodiment, the web page comprises a form and the field comprises one of a plurality of information fields required to fill out the form.

The method of claim 31, further comprising audibilizing the answer to the user as the answer is entered into the field.

In an embodiment, the method further includes using an audio sprite to facilitate audibilizing the answer to the user as the answer is entered into the field.

In an embodiment, the audio sprite comprises a CSS to define which characters are audibilized at particular timed intervals.

A method is also provided for controlling a primary device using a hand held device to allow low vision users to access the primary device using the hand held device. The method includes: pairing the hand held device with the primary device; displaying a menu of elements on the primary device; speaking a voice command into the hand held device; sending the voice command to a remote server to generate a STT file of the voice command; and processing the STT file by the primary device to execute the voice command.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A computer-implemented method of programmatically assigning a descriptive attribute to an untagged element on a web page or an electronic document accessible online to enable an audible description of the untagged element, the web page or electronic document having an associated document object model (DOM), the method comprising:
   dynamically analyzing, by a computer system, code associated with the web page or electronic document, the code comprising at least the DOM or HTML code;
   detecting, by the computer system, one or more compliance issues in the code, wherein at least one of the one or more compliance issues comprises the untagged element lacking an adequate attribute, wherein the one or more compliance issues are defined by Web Content Accessibility Guidelines (WCAG) 2.0, Accessible Rich Internet Applications (WAI-ARIA), Authoring Tool Accessibility Guidelines (ATAG), or Section 508 Standards and Technical Requirements;
   applying, by the computer system, one or more pre-existing remediations to the one or more compliance issues, wherein the one or more pre-existing remediations is generated by a remote server system performing at least:
      accessing the code associated with the web page or electronic document;
      receiving, by the remote server system, via a remediation interface input from a user, the input comprising a remediation action to manually remediate a non-programmatically-fixable compliance issue associated with the web page or electronic document;
      generating, by the remote server system, the one or more pre-existing remediations based on the input comprising the remediation action to manually remediate the non-programmatically-fixable compliance issue;

storing, by the remote server system, the one or more pre-existing remediations in an electronic data storage medium; and assigning, by the computer system, an attribute to the untagged element in the code of the web page or electronic document based on the one or more pre-existing remediations, the attribute assigned to the untagged element.

2. The computer-implemented method of claim 1, wherein the one or more pre-existing remediations are javascript.

3. The computer-implemented method of claim 1, wherein the untagged element is an input field.

4. The computer-implemented method of claim 1, wherein the untagged element is an image.

5. The computer-implemented method of claim 1, wherein the untagged element is a title element.

6. The computer-implemented method of claim 1, wherein the untagged element lacks the adequate descriptive attribute when one or more descriptive attributes of the untagged element are erroneous.

7. The computer-implemented method of claim 1, wherein the assigning comprises changing the DOM or HTML code associated with the web page or electronic document.

8. The computer-implemented method of claim 1, wherein the descriptive attribute is an HTML label.

9. The computer-implemented method of claim 1, wherein the descriptive attribute is an alt-text label.

10. The computer-implemented method of claim 1, wherein the computer system comprises one or more computing systems.

11. A non-transitory electronic storage medium with computer code stored thereon, the computer code configured to programmatically assign a descriptive attribute to an element on a web page or electronic document to enable an audible description of the element, the web page or electronic document having an associated document object model (DOM), and the computer code configured to perform, when executed by a computer processor, the steps of:

dynamically analyzing, by a computer system, code associated with the web page or electronic document, the code comprising at least the DOM or HTML code;

detecting, by the computer system, one or more compliance issues in the code, wherein at least one of the one or more compliance issues comprises the element lacking an adequate attribute, wherein the one or more compliance issues are defined by Web Content Accessibility Guidelines (WCAG) 2.0, Accessible Rich Internet Applications (WAI-ARIA), Authoring Tool Accessibility Guidelines (ATAG), or Section 508 Standards and Technical Requirements;

applying, by the computer system, one or more pre-existing remediations to the one or more compliance issues, wherein the one or more pre-existing remediations is generated by a remote server system performing at least:

accessing the code associated with the web page or electronic document;

receiving, by the remote server system, via a remediation interface input from a user, the input comprising a remediation action to manually remediate a non-programmatically-fixable compliance issue associated with the web page or electronic document;

generating, by the remote server system, the one or more pre-existing remediations based on the input comprising the remediation action to manually remediate a non-programmatically-fixable compliance issue;

storing, by the remote server system, the one or more pre-existing remediations in an electronic data storage medium; and assigning, by the computer system, an attribute to the element in the code of the web page or electronic document based on the one or more pre-existing remediations, the attribute assigned to the element adapted to enable an assistive technology to speak the descriptive attribute to a user.

12. The non-transitory electronic storage medium with computer code stored thereon of claim 11, wherein the one or more pre-existing remediations are javascript.

13. The non-transitory electronic storage medium with computer code stored thereon of claim 11, wherein the element is an input field.

14. The non-transitory electronic storage medium with computer code stored thereon of claim 11, wherein the element is an image.

15. The non-transitory electronic storage medium with computer code stored thereon of claim 11, wherein the element is a title element.

16. The non-transitory electronic storage medium with computer code stored thereon of claim 11, wherein the element lacks the adequate descriptive attribute when one or more descriptive attributes of the element are erroneous.

17. The non-transitory electronic storage medium with computer code stored thereon of claim 11, wherein the assigning comprises changing the DOM or HTML code associated with the web page or electronic document.

18. The non-transitory electronic storage medium with computer code stored thereon of claim 11, wherein the descriptive attribute is an HTML label.

19. The non-transitory electronic storage medium with computer code stored thereon of claim 11, wherein the descriptive attribute is an alt-text label.

20. The non-transitory electronic storage medium with computer code stored thereon of claim 11, wherein the computer system comprises one or more computing systems.

* * * * *